United States Patent
Zhang et al.

(10) Patent No.: US 11,465,706 B1
(45) Date of Patent: Oct. 11, 2022

(54) WHEEL AND SCOOTER

(71) Applicant: SHENZHEN CHITADO TECHNOLOGY CO., LTD, Shenzhen (CN)

(72) Inventors: Dianxuan Zhang, Shenzhen (CN); Dengjin Zhou, Shenzhen (CN); Huihai Zeng, Shenzhen (CN); Dengbing Zhou, Shenzhen (CN)

(73) Assignee: SHENZHEN CHITADO TECHNOLOGY CO, LTD, Shenzhen (CN)

( * ) Notice: Subject to any disclaimer, the term of this patent is extended or adjusted under 35 U.S.C. 154(b) by 0 days.

(21) Appl. No.: 17/725,538

(22) Filed: Apr. 20, 2022

(30) Foreign Application Priority Data

Jan. 25, 2022 (CN) .......................... 202220199295.X

(51) Int. Cl.
  *F21S 45/50* (2018.01)
  *B62J 6/20* (2006.01)
  *F21W 105/00* (2018.01)
  *F21Y 115/10* (2016.01)

(52) U.S. Cl.
  CPC ............... *B62J 6/20* (2013.01); *F21S 45/50* (2018.01); *F21W 2105/00* (2018.01); *F21Y 2115/10* (2016.08)

(58) Field of Classification Search
  CPC ........ B62J 6/20; F21S 45/50; F21W 2105/00; F21Y 2115/10
  See application file for complete search history.

(56) References Cited

U.S. PATENT DOCUMENTS

| | | | |
|---|---|---|---|
| 9,428,007 B1* | 8/2016 | Becker | B60B 7/006 |
| 10,737,612 B2 | 8/2020 | Zhang et al. | |
| 2007/0274085 A1* | 11/2007 | Hampton | B60Q 1/326 362/500 |
| 2017/0136813 A1* | 5/2017 | Becker | F21V 23/0435 |
| 2019/0193628 A1* | 6/2019 | Chen | B62K 3/002 |
| 2020/0148100 A1* | 5/2020 | Zhang | B60Q 1/326 |

FOREIGN PATENT DOCUMENTS

| | | |
|---|---|---|
| CN | 209441104 U | 9/2019 |
| CN | 209454459 U | 10/2019 |
| CN | 209479859 U | 10/2019 |

* cited by examiner

*Primary Examiner* — Evan P Dzierzynski

(57) ABSTRACT

Disclosed are a wheel and a scooter. The wheel includes a wheel body, a light-emitting assembly, a first optical element, a second optical element, and an outer end cover, where the wheel body includes a hub housing, the hub housing is provided with a lamp cavity structure facing an outer side of the wheel, the first optical element is installed at a bottom of the lamp cavity structure, the second optical element is installed at an opening of the lamp cavity structure, the light-emitting assembly is arranged between the first optical element and the second optical element, and the outer end cover covers an outer side of the second optical element. A first protrusion and a second protrusion are provided in a contact position of the hub housing where the hub housing can contact the outer end cover, and the first protrusion and the second protrusion form a groove structure.

20 Claims, 19 Drawing Sheets

WHEEL AND SCOOTER

TECHNICAL FIELD

The present disclosure relates to the technical field of scooters, and in particular, to a wheel and a scooter.

BACKGROUND

With the improvement of people's living standards, people's demand for beauty of products is getting increasingly higher. As scooters are used as common means of transportation and entertainment in life, many manufacturers design wheels of the scooters in such a way that the wheels can emit light. The light-emitting wheels are highly ornamental especially at night, which is deeply liked by the public. However, in rainy or other environments in which water easily enters a scooter, water easily enters a lamp cavity structure through a gap between a wheel body and an outer end cover. This may corrode a light-emitting assembly in the lamp cavity structure, or even lead to the functional failure of the light-emitting assembly.

SUMMARY

The present disclosure provides a wheel and a scooter, which can effectively improve a waterproof effect of the wheel, ensure that impurity liquid and the like outside the wheel do not penetrate into a lamp cavity structure, and prevent the failure of a light-emitting assembly inside the lamp cavity structure.

According to a first aspect of the present disclosure, the present disclosure provides a wheel, including a wheel body, a light-emitting assembly, a first optical element, a second optical element, and an outer end cover, where the wheel body includes a hub housing, the hub housing is provided with a lamp cavity structure facing an outer side of the wheel, the first optical element is installed at a bottom of the lamp cavity structure, the second optical element is installed at an opening of the lamp cavity structure, the light-emitting assembly is arranged between the first optical element and the second optical element, and the outer end cover covers an outer side of the second optical element, where a first protrusion and a second protrusion are provided in a contact position of the hub housing where the hub housing can contact the outer end cover, and the first protrusion and the second protrusion jointly form a groove structure.

According to a second aspect of the present disclosure, the present disclosure further provides a wheel, including a wheel body, a light-emitting assembly, a first optical element, a second optical element, and an outer end cover, where the wheel body includes a hub housing, the hub housing is provided with a fourth protrusion circumferentially arranged around the central axis of the wheel body, the fourth protrusion forms a lamp cavity structure for installing the light-emitting assembly, the first optical element, and the second optical element, and the outer end cover covers an opening of the lamp cavity structure, where one end of an upper surface of the fourth protrusion away from the central axis of the wheel body is provided with a fifth protrusion, the outer end cover is installed on an inner side of the fifth protrusion, and the light-emitting assembly is arranged between the first optical element and the second optical element.

According to a third aspect of the present disclosure, the present disclosure further provides a scooter, including a frame and the foregoing wheels, where the wheels are installed on two sides of the frame.

The technical solutions according to the embodiments of the present disclosure may include the following beneficial effects: In the present disclosure, a wheel and a scooter are provided. A first protrusion and a second protrusion are arranged on a hub housing at intervals, and the first protrusion and the second protrusion jointly form a groove structure. The main function of the groove structure is to provide an isolation region in the hub housing, so as to prevent solid or liquid impurities such as dust and water drops outside the hub housing from entering the hub housing, that is, the dust or water drops first stay in the groove structure rather than immediately enter the hub housing.

It should be understood that the foregoing general descriptions and the following detailed descriptions are only examples and are explanatory, and cannot limit the present disclosure.

BRIEF DESCRIPTION OF DRAWINGS

To more clearly describe technical solutions in the embodiments of the present disclosure, accompanying drawings required in the description of the embodiments or are briefly described below. Obviously, the accompanying drawings in the following description illustrate some of the embodiments of the present disclosure, and a person of ordinary skill in the art may further obtain other accompanying drawings from these accompanying drawings without creative efforts.

DESCRIPTION OF REFERENCE NUMERALS

Figure 1:
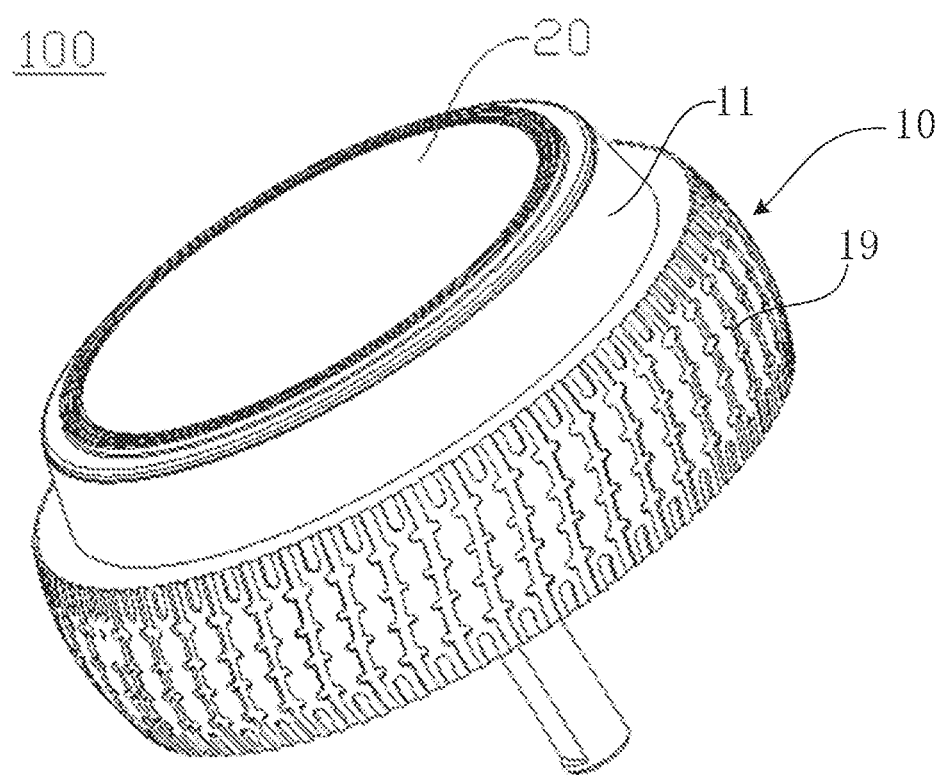
FIG. 1 is a schematic structural diagram of a wheel according to an embodiment of the present disclosure.

100. Wheel;
10. Wheel body; 11. Hub housing; 111. First protrusion; 111a. First step section; 111b. Second step section; 112. Second protrusion; 113. Groove structure; 114. Third protrusion; 12. Wheel axle; 121. Routing hole; 122. Wheel axle electrode; 13. Lamp accommodating structure; 131. Lamp holder bottom; 132. lamp holder abutting table; 133. Light outlet groove; 134. lamp holder buckle; 135. Connecting groove; 136. Routing groove; 14. Lamp cavity structure; 15. Motor; 16. Conductive sheet;
20. Outer end cover; 21. End cover protrusion; 211. Arc-shaped structure; 22. First fixed column; 23. Annular flange; 231. First buckle; 24. Outer cover protrusion;
30. Flexible member; 31. Vertical section; 311. Notch structure; 32. Horizontal section; 33. Fixed section; 34. Abutting section;
40. First optical element;
50. Second optical element; and
60. Light-emitting assembly.

DESCRIPTION OF EMBODIMENTS

The technical solutions in the embodiments of the present disclosure are clearly and completely described below with reference to the accompanying drawings in the embodiments of the present disclosure. Clearly, the described embodiments are only some embodiments of the present disclosure rather than all embodiments. Based on the embodiments of the present disclosure, all other embodiments that are obtained by a person of ordinary skill in the art without creative efforts shall all fall within the protection scope of the present disclosure.

In the description of the present disclosure, it should be understood that the orientation or positional relationship indicated by the terms such as "center", "longitudinal", "transverse", "length", "width", "thickness", "upper", "lower", "front", "rear", "left", "right", "vertical", "horizontal", "top", "bottom", "inner", "outer", "clockwise", and "counterclockwise" is based on the orientation or positional relationship shown in the accompanying drawings, is merely for ease of describing the present disclosure and simplifying the description, and is not intended to indicate or imply that the apparatus or element referred to must have a particular orientation and be constructed and operated in a particular orientation. Therefore, this should not be construed as limiting the present disclosure. In addition, the terms "first" and "second" are used for descriptive purposes only and cannot be construed as indicating or implying relative importance or implying the quantity of indicated technical features. Therefore, a feature defined with "first" or "second" may explicitly or implicitly includes one or more of the features. In the description of embodiments of the present disclosure, "a plurality of" means two or more, unless otherwise expressly and specifically defined.

In addition, the descriptive terms for indicating actions, such as "connecting", "installing" and "encircling", which are involved in the present disclosure should be broadly understood with reference to the inventive concept of the present disclosure. For example, the terms should be understood as at least direct implementation, indirect implementation, fixed implementation, movable implementation, or the like. For example, "installing" may be understood as direct installation or indirect installation by using, for example, a third-party element, as well as fixed installation or movable installation. The movable installation may be, for example, hinging.

Some implementations of the present disclosure will be described in detail below with reference to the accompanying drawings. Without conflict, the following embodiments and features in the embodiments may be combined with each other.

As shown in FIG. 1 to FIG. 28, according to a first aspect of the present disclosure, a wheel 100 according to the present disclosure is applicable to a scooter such as a balance vehicle, a go-kart, a kick scooter, a hoverboard, or an electric vehicle. The wheel 100 may include a wheel body 10. The wheel body 10 may be regarded as a main structure of the wheel 100. Therefore, the wheel body 10 may provide a main supporting function for the wheel 100. Specifically, the wheel body 10 may include a hub housing 11 and a tire 19. The tire 19 may cover an outer side of the hub housing 11, so that the hub housing 11 is prevented from being squeezed and deformed, and impact resistance of the hub housing 11 is effectively improved. The tire 19 is provided with tread patterns to increase a frictional force of the wheel body 10, thereby improving stability of the wheel body 10.

Herein, the tire 19 and the hub housing 11 may be formed integrally, or may be separately fabricated and then assembled. The tire 19 may be a solid tire, or may be a non-solid tire.

In addition, the hub housing 11 mainly provides a support function for the wheel 100. More specifically, for example, the hub housing 11 provides a support function for another component (for example, a light-emitting assembly described below) that is installed in the hub housing 11 or installed in the wheel body 10, so as to prevent these components from being in direct contact with the tire 19 and being squeezed.

Figure 2:
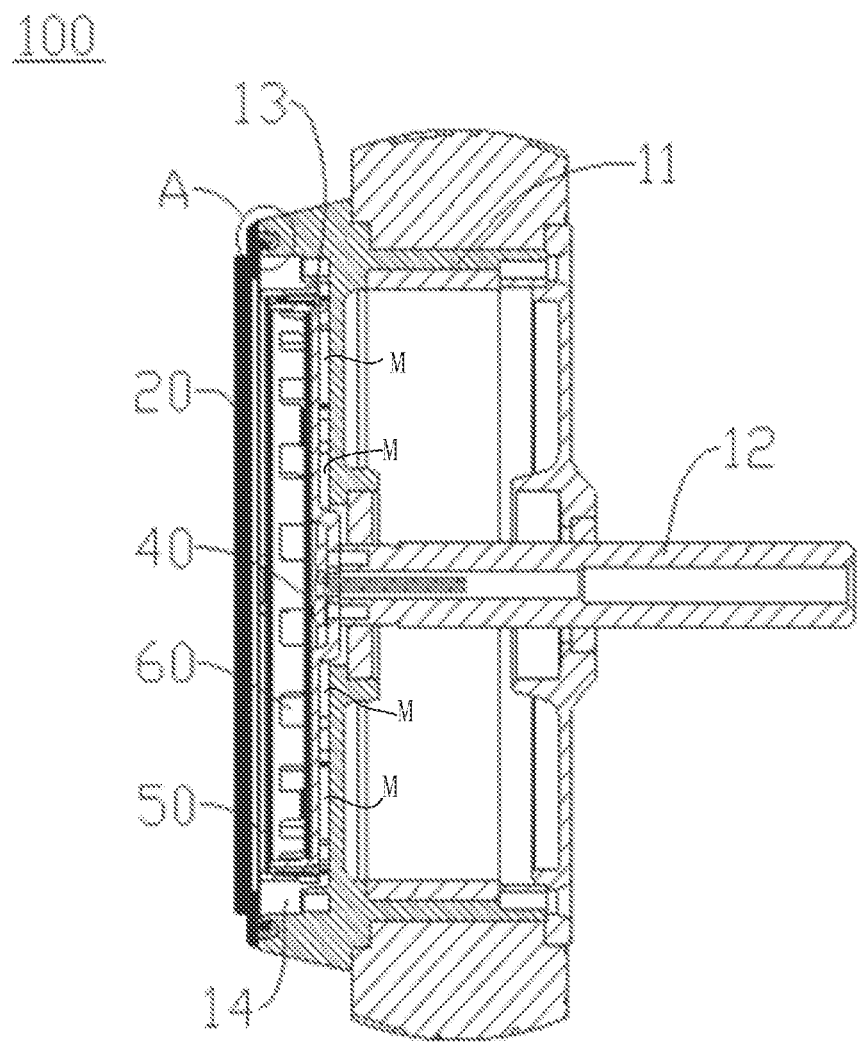
FIG. 2 is a schematic sectional view of the wheel in FIG. 1.

In an optional implementation, referring to FIG. 2, the wheel 100 may further include a light-emitting assembly 60, a first optical element 40, a second optical element 50, and an outer end cover 20. The hub housing 11 is provided with a lamp cavity structure 14 facing an outer side of the wheel 100, the first optical element 40 is installed at a bottom of the lamp cavity structure 14, and the second optical element 50 is installed at an opening of the lamp cavity structure 14.

It should be noted that the main function of the lamp cavity structure 14 is to provide a cavity space on the hub housing 11 that is enough to accommodate relevant necessary elements, and the necessary elements include, but are not limited to, the first optical element and the second optical element. The cavity space is not particularly limited in shape, for example, the cavity space may be a cylindrical cavity. In this case, as mentioned above, the lamp cavity structure 14 may have a bottom and an opening opposite to the bottom.

In addition, referring to FIG. 2, a direction from the first optical element 40 to the second optical element 50 may be defined as a direction in which the outer side of the wheel 100 or the wheel body 10 is located.

In this implementation, the first optical element 40 mainly achieves the function of optical reflection, and a type, a shape and a manufacturing material of the first optical element are not particularly limited. Therefore, the first optical element 40 may be broadly understood as a mirror, and mirrors may fall into three types based on shapes: plane mirrors, spherical mirrors, and aspherical mirrors. Based on a degree of reflection, mirrors may fall into total reflection mirrors and transflective mirrors (also referred to as beam splitters). Preferably, in this implementation, the first optical element 40 is a plane mirror.

In this implementation, a type, a shape and a manufacturing material of the second optical element 50 are not particularly limited. For example, the material of the second optical element 50 may be acrylic or glass, so that the second optical element 50 has appropriate transparency and reflectivity, and has a main function of implementing transmission and reflection of light at the same time. More specifically, when at least one surface of the second optical element 50 is irradiated by light, part of light may pass through the second optical element 50 while the other part of the light may be reflected back. Based on this function, the second optical element 50 may be referred to as a two-way mirror for short.

In this implementation, the light-emitting assembly 60 is arranged between the first optical element 40 and the second optical element 50, and the outer end cover 20 covers an outer side of the second optical element 50, and may protect the light-emitting assembly 60, the first optical element 40, and the second optical element 50.

In addition, the light-emitting assembly 60 mainly provides a light source, and a type and a shape of the light-emitting assembly 60 are not limited, for example, the light-emitting assembly 60 may be an annular band-shaped LED light bar.

In addition, the outer side of the second optical element 50 may mean one side of the second optical element 50 facing the outer side of the wheel 100.

After the foregoing technical solution is adopted, because the light-emitting assembly 60, the first optical element 40 and the second optical element 50 are installed in the lamp cavity structure 14, and the light-emitting assembly 60 is arranged between the first optical element 40 and the second optical element 50, when light emitted by the light-emitting assembly 60 reaches the second optical element 50, part of the light is reflected, and the reflected light will be reflected again when reaching the first optical element 40. Therefore, the light emitted by the light-emitting assembly 60 can be continuously reflected between the first optical element 40 and the second optical element 50, and then emitted from a perspective surface of the second optical element 50 toward the outer side of the wheel body 10, so that an observer can see a cool light effect after the light emitted by the light-emitting assembly 60 is infinitely reflected.

Specifically, in the present disclosure, optical characteristics of the second optical element 50 and the first optical element 40 are used to enable an entity or image of the light-emitting assembly 60 to be reflected back and forth between the second optical element 50 and the first optical element 40 for infinite times, so that the external observer may have the illusion that light-emitting assemblies 60 extend into a black hole of the wheel 100 one by one indefinitely, thereby increasing aesthetics of the product and improving the market competitiveness.

In an optional implementation, the first optical element 40 may be a plane mirror and the second optical element 50 may be a two-way mirror, where an area of any side of the two-way mirror is greater than an area of a reflecting surface of the plane mirror. This can ensure that all the mirror images of the light-emitting assembly reflected by the plane mirror can be seen at least from a front angle after passing through the two-way mirror, so that the area of the reflecting surface of the plane mirror does not need to be greater than or equal to the area of any side of the two-way mirror, the waste of manufacturing materials can be reduced, because, in terms of a viewing effect, when the area of the reflecting surface of the plane mirror is greater than or equal to the area of any side of the two-way mirror, the visual light effect cannot be improved, but only a cost of the plane mirror is increased.

In an optional implementation, central axes of the first optical element 40 and the second optical element 50 are collinear to ensure that mirror images of the light-emitting assembly formed by multiple reflections can be arranged neatly visually.

It should be noted that the second optical element 50, the first optical element 40 and the light-emitting assembly 60 are installed in the lamp cavity structure 14. It may be understood that the second optical element 50, the first optical element 40 and the light-emitting assembly 60 are directly fixed in the lamp cavity structure 14, or the second optical element 50, the first optical element 40 and the light-emitting assembly 60 are fixed to a lamp accommodating structure 13, and then the lamp accommodating structure 13 is installed in the lamp cavity structure 14. That is, whether the second optical element 50, the first optical element 40 and the light-emitting assembly 60 are directly fixed in the lamp cavity structure 14 or indirectly fixed in the lamp cavity structure 14 is not limited in the present disclosure, and the main purpose is to limit the relative positions of the second optical element 50, the first optical element 40 and the light-emitting assembly 60 within the lamp cavity structure 14.

In an optional implementation, referring to FIG. 2, FIG. 3, FIG. 13, FIG. 29, and FIG. 30, a first protrusion 111 and a second protrusion 112 may be provided at intervals in a contact position of the hub housing 11 where the hub housing 11 can contact the outer end cover 20. Herein, the contact position of the hub housing 11 where the hub housing 11 can contact the outer end cover 20 may be understood as a suitable local region on the hub housing 11. In this local region, the hub housing 11 and the outer end cover 20 may implement various suitable connections or contacts. For example, the local region may be represented at least as a part belonging to the hub housing 11 in a part A of FIG. 2. This part may be considered as an end region adjacent to the outer end cover 20 of the hub housing 11. In this case, the outer end cover 20 may be in close contact with the hub housing 11 in this contact position. For example, when the outer end cover 20 is assembled on the hub housing 11, the outer end cover 20 and the hub housing 11 may be in relatively close contact in the foregoing local region.

Figure 29:
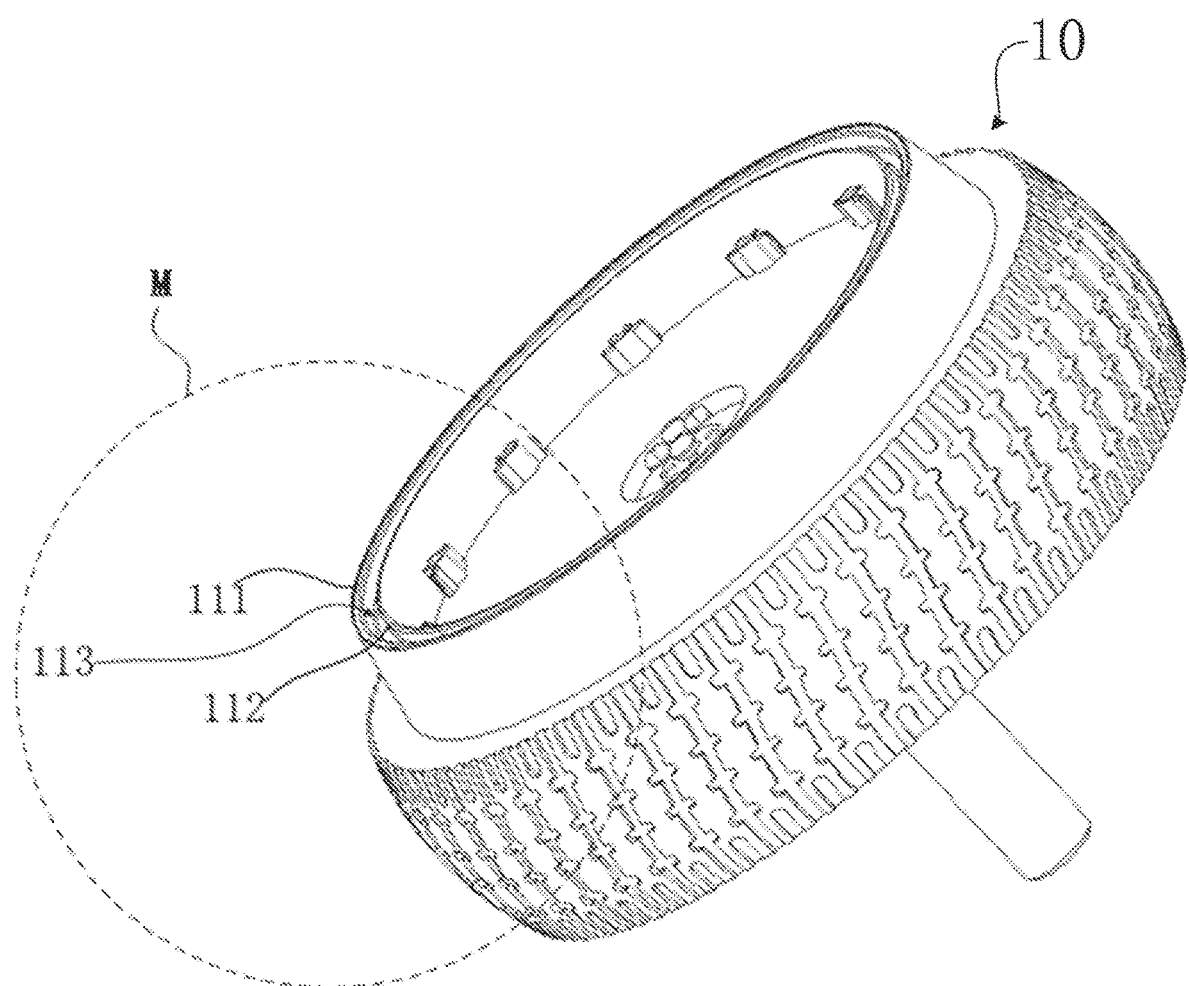
FIG. 29 is a schematic diagram of a wheel body after an outer end cover is removed according to an embodiment of this application.
Figure 30:
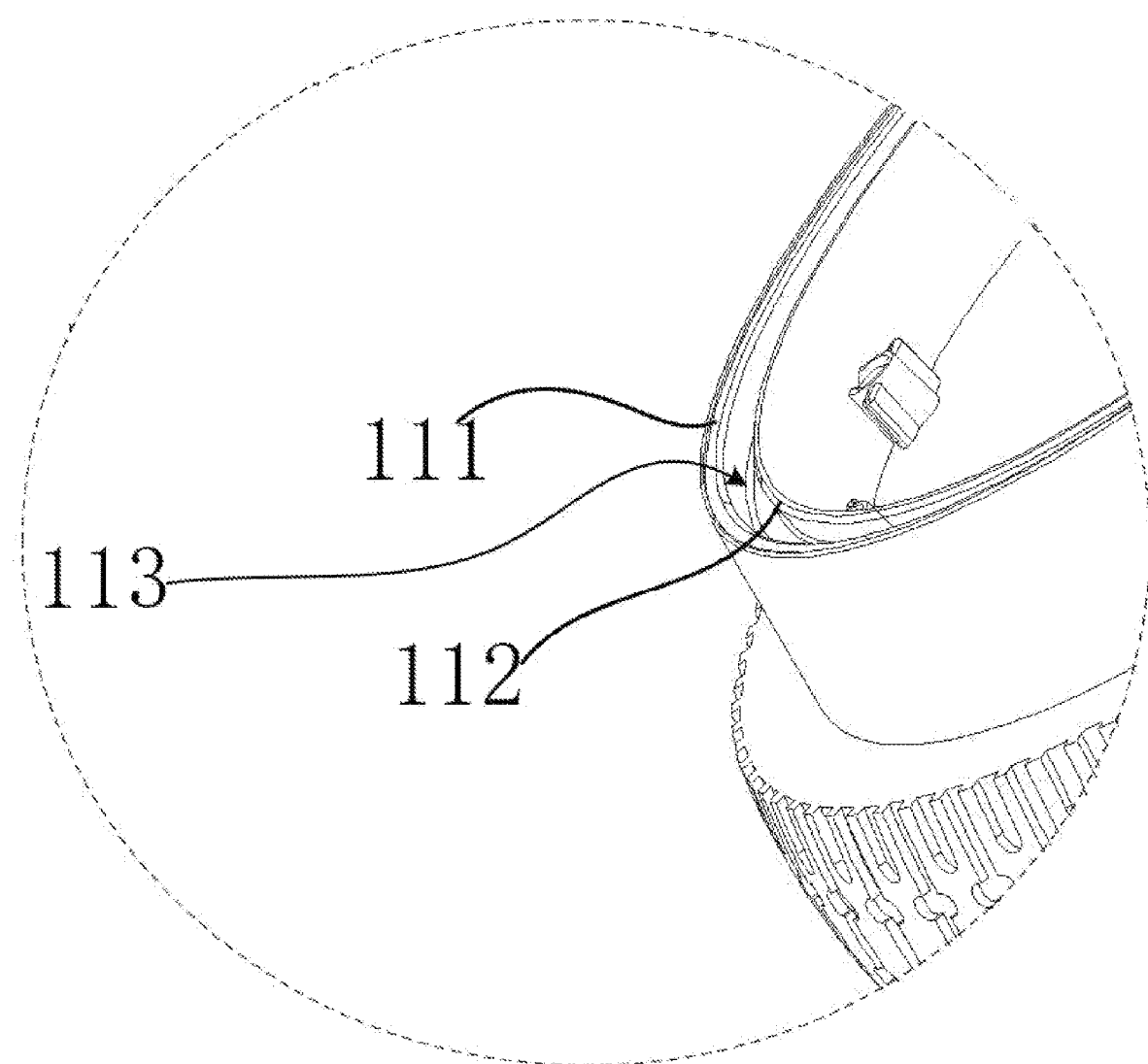
FIG. 30 is a schematic enlarged view of M in FIG. 29.

In addition, referring to FIG. 29 and FIG. 30, the first protrusion 111 and the second protrusion 112 jointly form a groove structure 113. The main function of the groove structure 113 is to provide an isolation obstacle region in the hub housing 11, so that if solid or liquid impurities such as dust or water drops outside the hub housing 11 enter the hub housing 11, the impurities will first stay in this region and will not immediately enter the hub housing 11, for example, it is difficult to enter the lamp cavity structure 14 and then affect some devices/circuits and the like arranged in the lamp cavity structure 14.

In addition, referring to FIG. 1, FIG. 29, and FIG. 30, the first protrusion 111 and the second protrusion 112 are generally two parts of the hub housing 11 that extend and protrude from a position of the bottom 1131 of the groove structure 113 toward the outside direction of the wheel 100. Certainly, herein, the bottom 1131 of the groove structure 113 may alternatively be considered as an end of the hub housing 11 opposite to the outer end cover 20, and shapes of the first protrusion 111 and the second protrusion 112 are not specially limited and may be roughly considered as two ridge protrusion parts that are distributed on the hub housing 11 in an annular shape and that abut against the outer end cover 20.

In an optional implementation, the groove structure 113 may be filled with a flexible member 30 to enhance the sealing performance between the hub housing 11 and the outer end cover 20.

In an optional implementation, a ratio of a height H2 of the first protrusion 111 or a height H1 of the second protrusion 112 to an average width L1 of the groove structure 113 is greater than 1 and less than 2.5. In this way, not only the flexible member 30 can be better fixed in the groove structure 113, but also that a liquid such as water is affected by gravity can be utilized, so that when entering the lamp cavity structure 14, the liquid such as water will pass through the groove structure 113 and be stored in the groove structure 113, that is, the groove structure 113 can effectively prevent the liquid such as water from entering the lamp cavity structure 14.

Specifically, when the liquid such as water enters the lamp cavity structure 14 from a gap between the hub housing 11 and the outer end cover 20, the liquid such as water will enter the groove structure 113. This can prevent the liquid such as water from directly entering the lamp cavity structure 14 through the gap between the hub housing 11 and the outer end cover 20. In addition, when the wheel 100 rotates, the groove structure 113 can throw out the liquid such as water in the groove structure 113, thereby solving the problem that the liquid such as external water enters the lamp cavity structure 14 from the gap between the hub housing 11 and the outer end cover 20.

Figure 13:
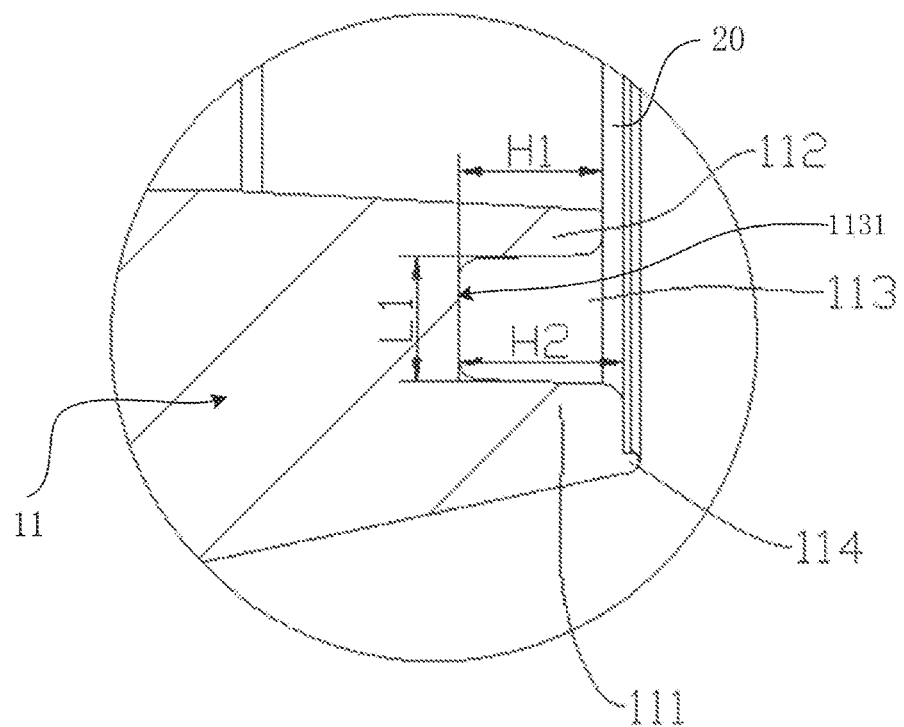
FIG. 13 is a schematic enlarged view of a position D in FIG. 12.
Figure 14:
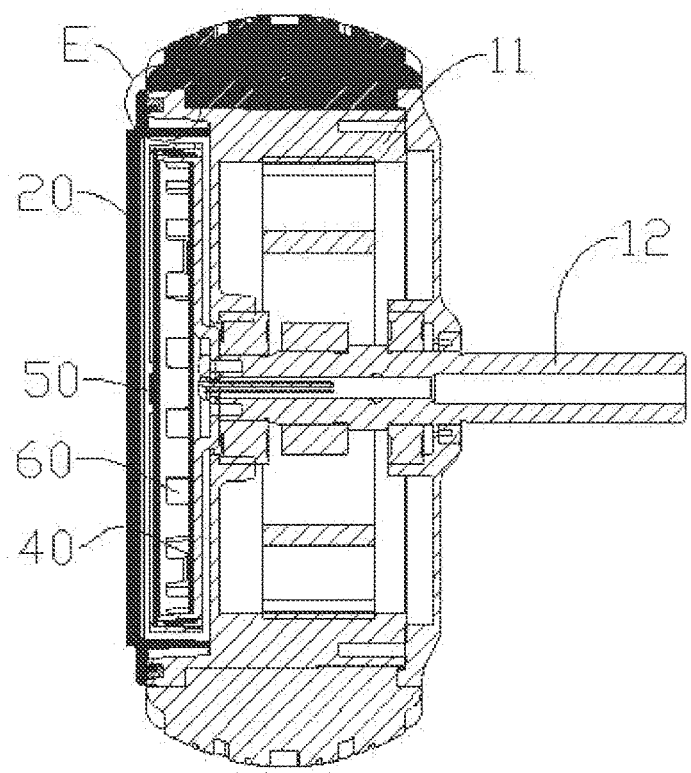
FIG. 14 is a schematic structural diagram of a wheel according to another embodiment of the present disclosure.

Referring to FIG. 13, the ratio of the height H2 of the first protrusion 111 or the height H1 of the second protrusion 112 to the average width L1 of the groove structure 113 is greater than 1.2 and less than 1.5, or the ratio of the height H2 of the first protrusion 111 or the height H1 of the second protrusion 112 to the average width L1 of the groove structure 113 is greater than 1.7 and less than 1.9. To facilitate the molding of the groove structure 113, the cross section of the groove structure 113 is usually designed to be similar to a rectangular structure, and to facilitate the installation of the outer end cover 20, the height H2 of the first protrusion 111 is usually designed to be greater than the height H1 of the second protrusion 112.

Because the groove structure 113 may be used to place the flexible member 30, the flexible member 30 may be a flexible filler, such as a silicone ring, EVA foam, or a sealant. This can not only meet requirements for low waterproof level by using the groove structure 113, but also meet requirements for high waterproof level by using filling the groove structure 113 with the flexible member 30. Specifically, different waterproof structures or a combination thereof may be selected according to the requirements to meet requirements for waterproof performance of the product.

When the flexible member 30 is placed in a deeper groove structure 113, it is easy to fix the flexible member 30. However, when the flexible member 30 is placed in a shallower groove structure 113, the flexible member 30 is easily separated from the groove structure 113 with slight vibration, thereby causing difficulties to an assembler. However, when the groove structure 113 is further deeper, the first protrusion 111 and the second protrusion 112 on two sides of the groove structure 113 will become elongated, the first protrusion 111 and the second protrusion 112 need to bear a pressure of the outer end cover 20, and the first protrusion 111 and the second protrusion 112 need to bear the gravity from a whole vehicle body especially when the vehicle body with the wheel 100 is placed sideways, or when the wheel 100 collides with an obstacle. Therefore, the depth of the groove structure 113 needs to be at a reasonable size to ensure strength and hardness of the first protrusion 111 or the second protrusion 112. It should be noted that the deeper groove structure 113 means that the ratio of the height H2 of the first protrusion 111 or the height H1 of the second protrusion 112 to the average width L1 of the groove structure 113 is greater than 1, while the shallower groove structure 113 means that the ratio of the height H2 of the first protrusion 111 or the height H1 of the second protrusion 112 to the average width L1 of the groove structure 113 is less than 1. In the present disclosure, the ratio of the height H2 of the first protrusion 111 or the height H1 of the second protrusion 112 to the average width L1 of the groove structure 113 is rationally designed, for example, the ratio may be greater than 1 and less than 2.5, mainly considering the foregoing problems.

In an optional implementation, as shown in FIG. 1 to FIG. 21, the outer end cover 20 is provided with an end cover protrusion 21 protruding in an axial direction, and the end cover protrusion 21 and the groove structure 113 match each other to form a labyrinth connection structure to form a waterproof wall, so that when the liquid such as water enters the lamp cavity structure 14, the liquid such as water can remain in the connection structure and is prevented from directly entering the lamp cavity structure 14. That the end cover protrusion 21 protrudes in the axial direction means that an extension direction of the end cover protrusion 21 is the same as a central axis direction of the outer end cover 20.

Figure 7:
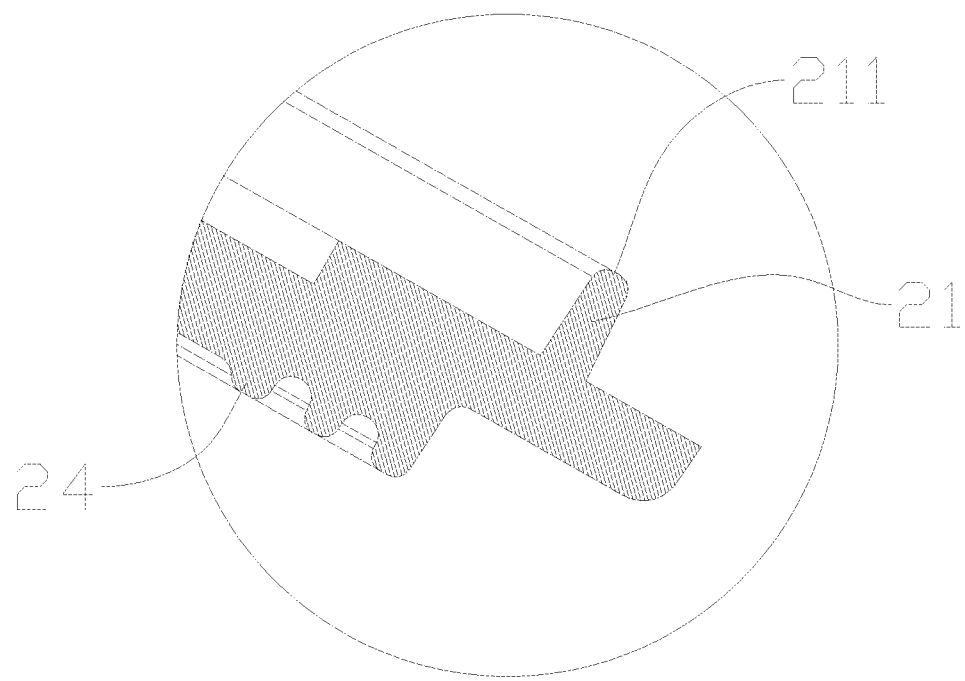
FIG. 7 is a schematic enlarged view of a position B in FIG. 6.

In an optional implementation, referring to FIG. 7, an end of the end cover protrusion 21 is provided with an arc-shaped structure 211 which retracts toward a central axis of the end of the end cover protrusion 21, and the arc-shaped structure 211 may be positioned inside the groove structure 113 and abut against a flexible member 30 filling the groove structure 113. This can not only achieve a guiding function and facilitate the installation of the outer end cover 20 on the hub housing 11, but also prevent the end cover protrusion 21 from damaging the flexible member 30 in the groove structure 113 and damaging the waterproof performance of the flexible member 30. That the arc-shaped structure 211 retracts toward the central axis of the end of the end cover protrusion 21 means that the arc-shaped structure 211 is arranged roughly symmetrically with respect to the central axis of the end cover protrusion 21, and the width of the end cover protrusion 21 gradually decreases from one end of the outer end cover 20 to a free end (that is, the end at which the arc-shaped structure 211 is located) of the end cover protrusion 21.

In an optional implementation, the first protrusion 111 is arranged on an outer side of the groove structure 113, and the second protrusion 112 is arranged on an inner side of the groove structure 113, where the height of the first protrusion 111 is greater than that of the second protrusion 112, so that an unstable connection between the outer end cover 20 and the hub housing 11 caused by production errors can be prevented. For example, if the height of the first protrusion 111 is designed to be the same as that of the second protrusion 112, two cases may easily occur in production errors. In the first case, the height of the second protrusion 112 is greater than that of the first protrusion 111, and in the second case, the height of the second protrusion 112 is less than that of the first protrusion 111. This may lead to the inconsistent positions of gaps between the outer end cover 20 and the hub housing 11, or even increase the difficulty of investigating causes of water inlet accidents of the lamp cavity structure 14 subsequently, and does not facilitate the determining and processing of a reference end face. After the waterproof performance in the two cases is tested, test results may be obtained, and it is concluded that when the height of the second protrusion 112 is less than that of the first protrusion 111, the waterproof performance is better, and it is convenient to accurately control tolerance of a molding part used to mold the first protrusion 111, and the tolerance of the second protrusion 112 may be relaxed, thereby reducing a lot of manufacturing costs.

In an optional implementation, the ratio of the height H2 of the first protrusion 111 to the height H1 of the second protrusion 112 is greater than 1.1 and less than 1.2. This design is performed mainly considering assembly of the outer end cover 20 and the hub housing 11. For example, referring to FIG. 3, when the outer end cover 20 is installed at an outlet of the lamp cavity structure 14, a certain slight gap K may be provided between the second protrusion 112 and the outer end cover 20. Such a gap may be necessary. For example, due to tolerance and other reasons, the size of the second protrusion 112 may not be completely suitable, for example, local protruding irregularities occur. Such a gap K may accommodate these inappropriate sizes, so as to ensure that the outer end cover 20 can be stably installed on the hub housing 11, and also ensure waterproof performance between the outer end cover 20 and the hub housing 11.

Figure 15:
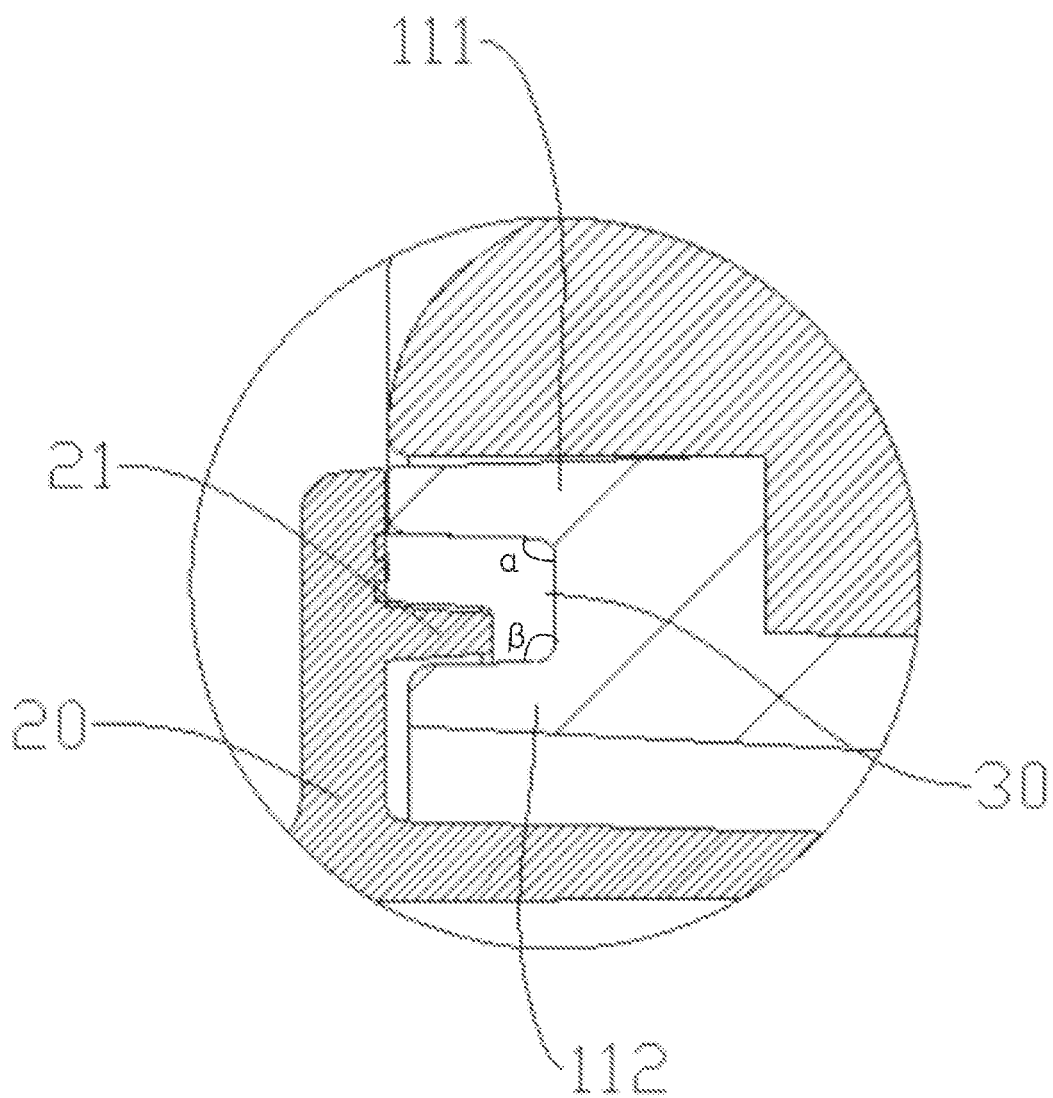
FIG. 15 is a schematic enlarged view of a position E in FIG. 14.
Figure 16:
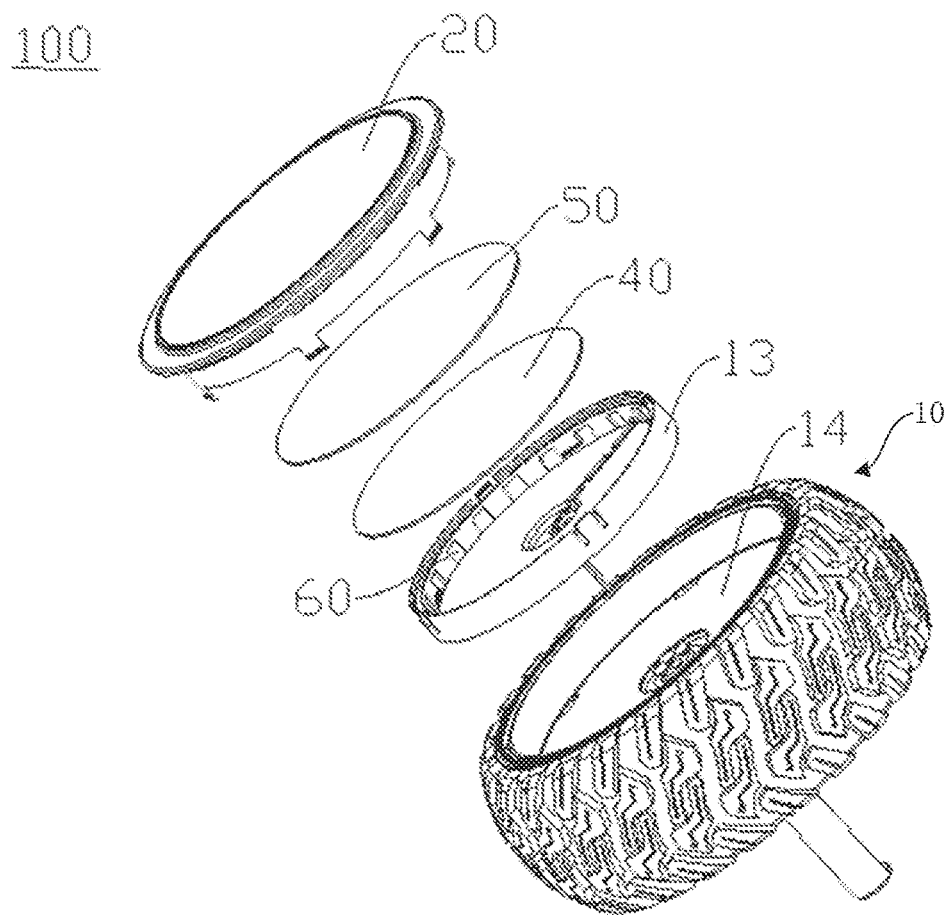
FIG. 16 is a schematic exploded view of the wheel in FIG. 14.
Figure 17:
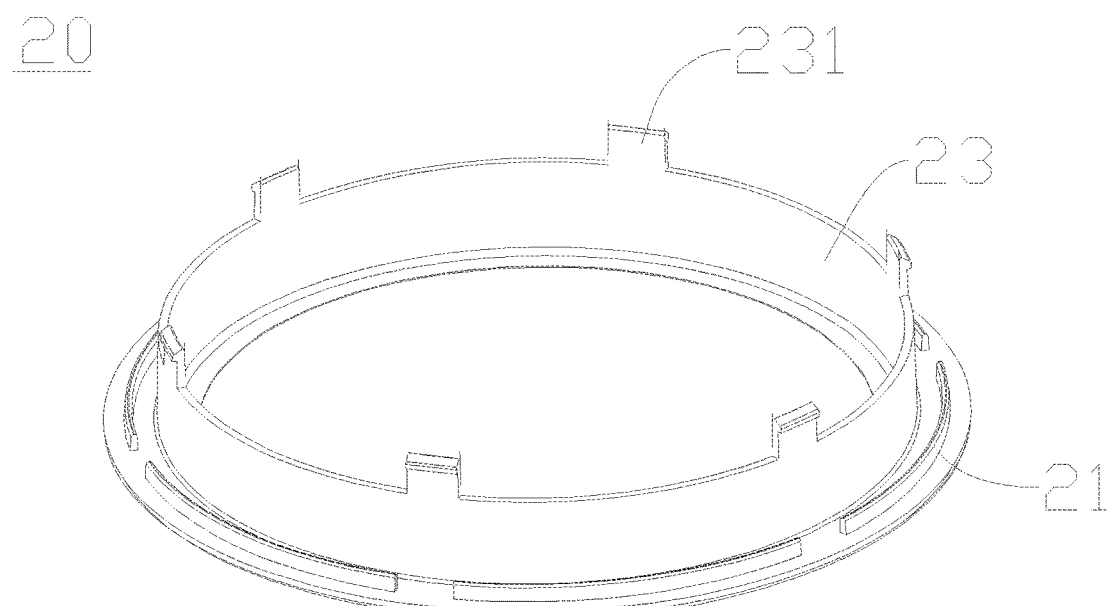
FIG. 17 is a schematic structural diagram of an outer end cover in FIG. 14.

In an optional implementation, referring to FIG. 15, a side face of the first protrusion 111 and a bottom surface of the groove structure 113 form an included angle α not equal to 90°; and/or, a side face of the second protrusion 112 and the bottom surface of the groove structure 113 form an included angle β not equal to 90°, so that the end cover protrusion 21 can be quickly inserted into the groove structure 113.

In an optional implementation, the included angle α is greater than 91° and less than 95°; and/or the included angle β is greater than 91° and less than 95° to ensure that the flexible member 30 can be stably installed in the groove structure 113. A result obtained by many experiments shows that the stability of the flexible member 30 is the best when the groove structure 113 is rectangular. In the present disclosure, the guiding function of the end cover protrusion 21 may be considered. Therefore, the included angle α and the included angle β may be greater than 91° and less than 93°.

Figure 11:
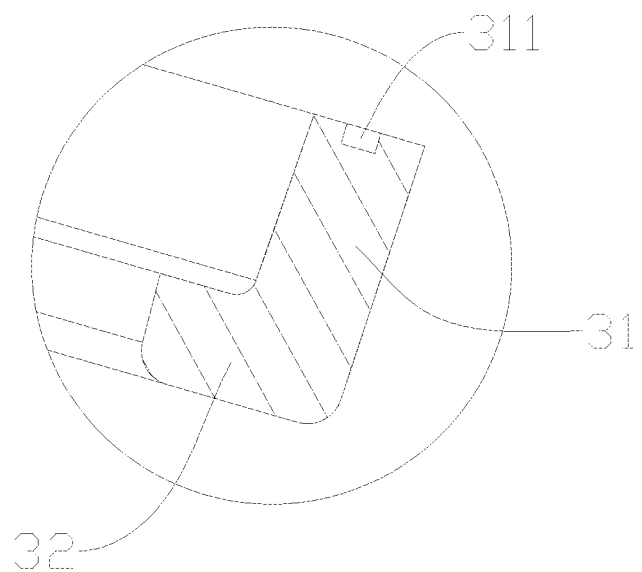
FIG. 11 is a schematic enlarged view of a position C in FIG. 10.
Figure 12:
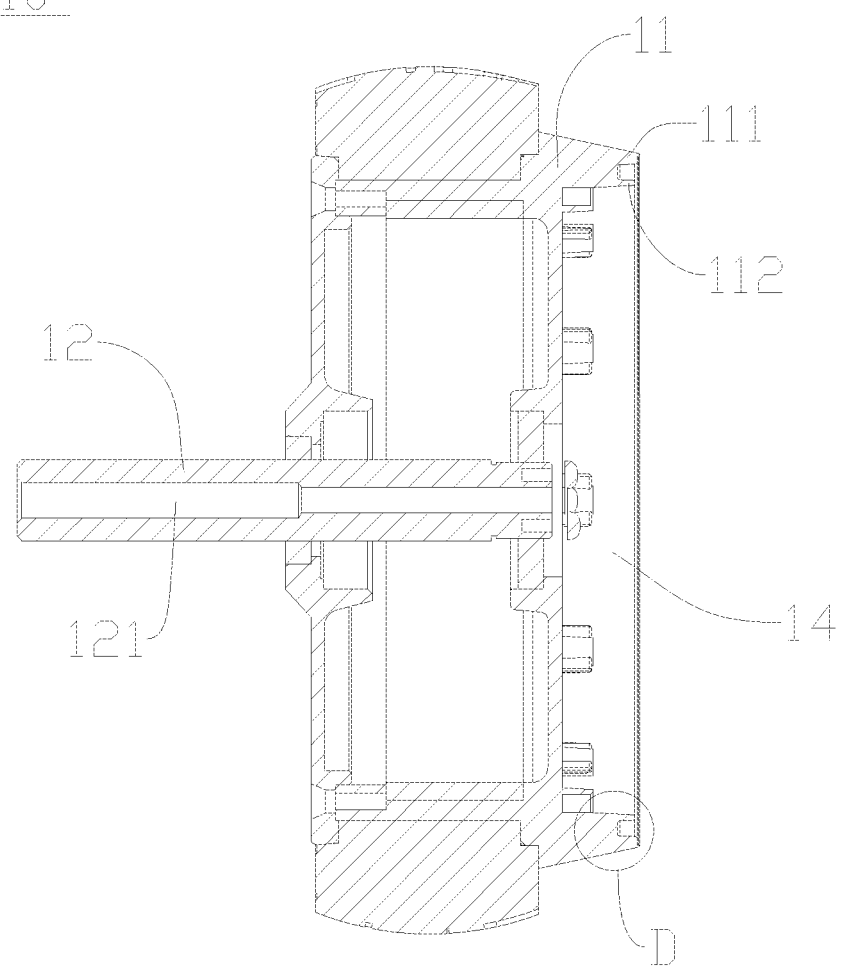
FIG. 12 is a schematic sectional view of a wheel body in FIG. 1.

In an optional implementation, referring to FIG. 11, the groove structure 113 is filled with a flexible member 30 with an L-shaped structure, and the flexible member 30 is provided with a roughly vertical section 31 and a roughly horizontal section 32. The term "roughly" may be understood as allowing an angle error of plus or minus 15°. A width of the horizontal section 32 matches the height of the groove structure 113, and the vertical section 31 fills between two side walls of both the end cover protrusion 21 and the groove structure 113, so that the arc-shaped structure 211 on the end cover protrusion 21 can squeeze the horizontal section 32 at a bottom of the groove structure 113, while the vertical section 31 fills between the side wall of the end cover protrusion 21 and the side wall of the groove structure 113, to achieve a good waterproof function.

In an optional implementation, the flexible member 30 is provided with a notch structure 311, so that when the end cover protrusion 21 matches the groove structure 113, two opposite sides of the notch structure 311 can fit together to form a waterproof groove, which once again improves the waterproof performance of the outer end cover 20 after connection to the hub housing 11.

Figure 3:
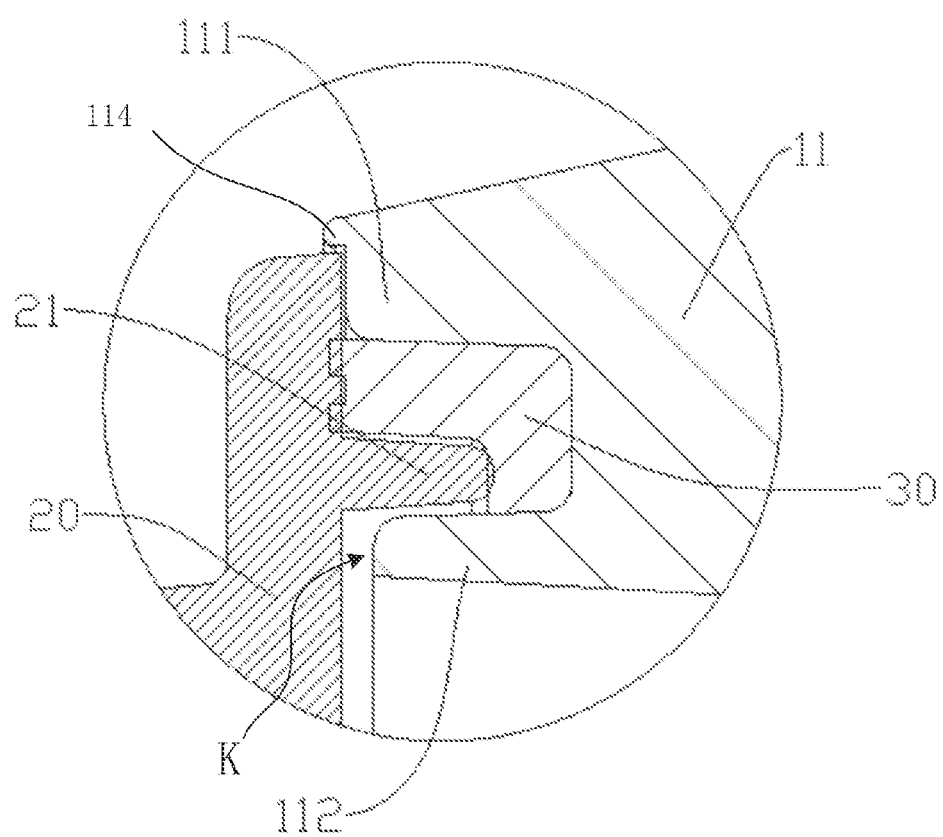
FIG. 3 is a schematic enlarged view of a part A in FIG. 2.
Figure 4:
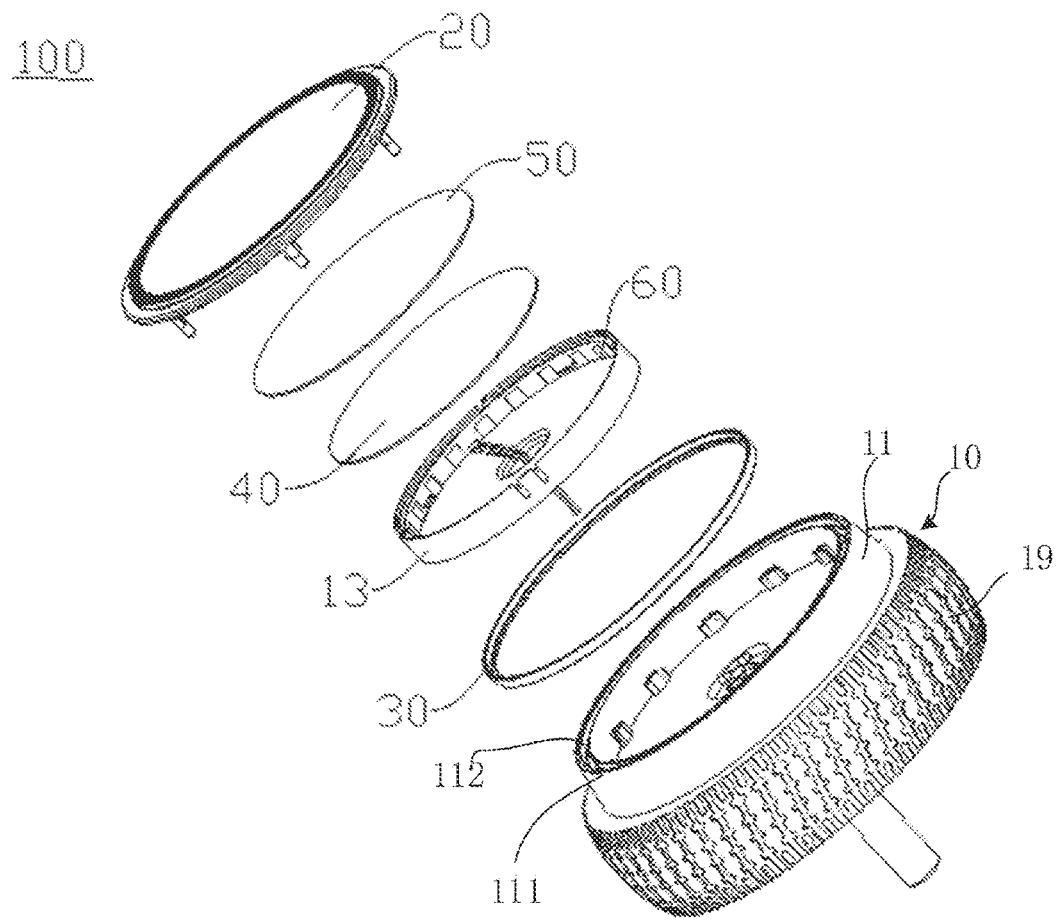
FIG. 4 is a schematic exploded view of the wheel in FIG. 1.

In an optional implementation, referring to FIG. 3, one end of an upper surface of the first protrusion 111 away from a central axis of the wheel body 10 is provided with a third protrusion 114, and the outer end cover 20 is installed on an inner side of the third protrusion 114. This may not only limit the outer end cover 20, but also further enhance the sealing performance between the outer end cover 20 and the hub housing 11.

In an optional implementation, the hub housing 11 is provided with a fourth protrusion circumferentially arranged around the central axis of the wheel body 10, the fourth protrusion forms a lamp cavity structure 14 for installing the light-emitting assembly 60, the first optical element 40, and the second optical element 50, and the outer end cover 20 covers an opening of the lamp cavity structure 14. One end of an upper surface of the fourth protrusion away from the central axis of the wheel body is provided with a fifth protrusion, the outer end cover 20 is installed on an inner side of the fifth protrusion, and the light-emitting assembly is arranged between the first optical element and the second optical element.

It should be noted that the fourth protrusion may be the first protrusion 111 or the second protrusion 112, or the fourth protrusion may be a protrusion structure in which the first protrusion 111 and the second protrusion 112 are connected without a groove structure 113, and the purpose is mainly to form a lamp cavity structure 14 with an accommodating space, and also to enable the outer end cover 20 to abut against an end face of the fourth protrusion or the opening of the lamp cavity structure 14. The shape and size of the fourth protrusion are not limited in the present disclosure.

In addition, the fifth protrusion may be similar to the third protrusion 114, and the shape and size of the fifth protrusion are not limited. The fifth protrusion is mainly a protrusion structure arranged on the fourth protrusion, so that the outer end cover 20 can be installed on the inner side of the fifth protrusion. This can not only limit the outer end cover 20, but also further enhance the sealing performance between the outer end cover 20 and the hub housing 11.

In an optional implementation, the hub housing 11 is provided with a first fixing part, the outer end cover 20 is provided with a first mounting part, and the outer end cover 20 is capable of being fixed to the hub housing 11 through a matching between the first mounting part and the first fixing part.

Figure 5:
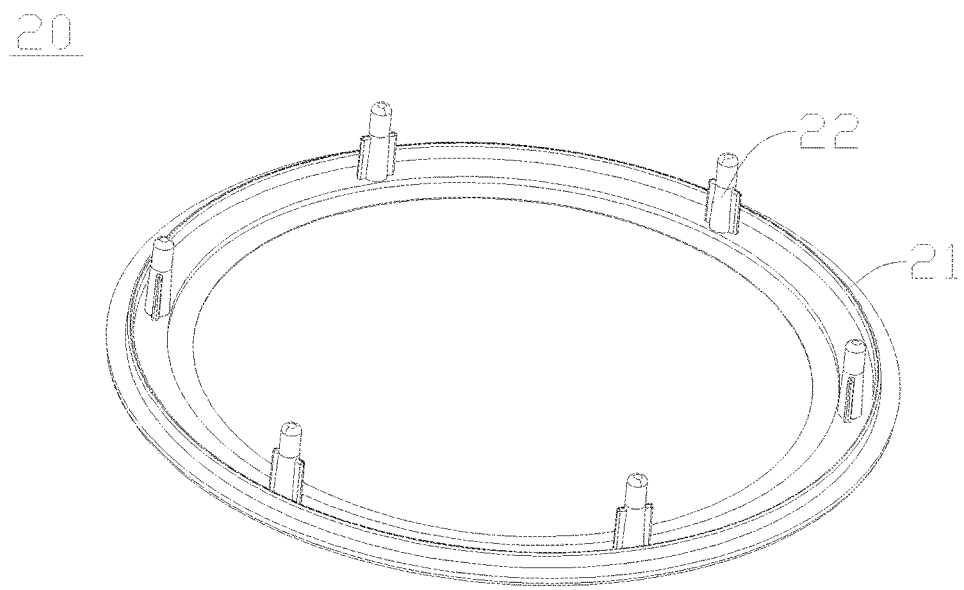
FIG. 5 is a schematic structural diagram of an outer end cover in FIG. 1.
Figure 6:
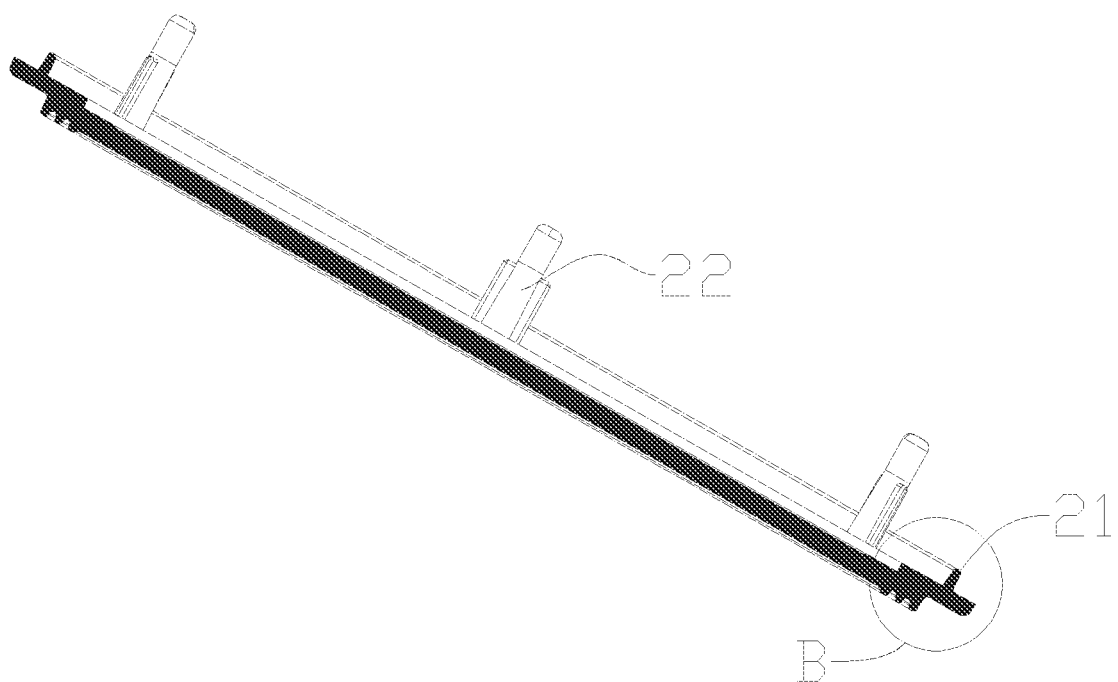
FIG. 6 is a schematic sectional view of the outer end cover in FIG. 1.

For example, referring to FIG. 5, the first fixing part is a first fixing hole annularly provided at a bottom of the hub housing 11, the first mounting part is a first fixed column 22 annularly arranged on the outer end cover 20, and the first fixed column 22 is clamped with the first fixing hole. A diameter of the first fixed column 22 gradually decreases from the joint between the first fixed column 22 and the outer end cover 20 toward a free end of the first fixed column 22, and the diameter of the first fixing hole matches the diameter of the free end of the first fixed column 22. This not only can ensure strength and hardness of the first fixed column 22, but also enables the first fixed column 22 to be firmly fixed in the first fixing hole.

Figure 18:
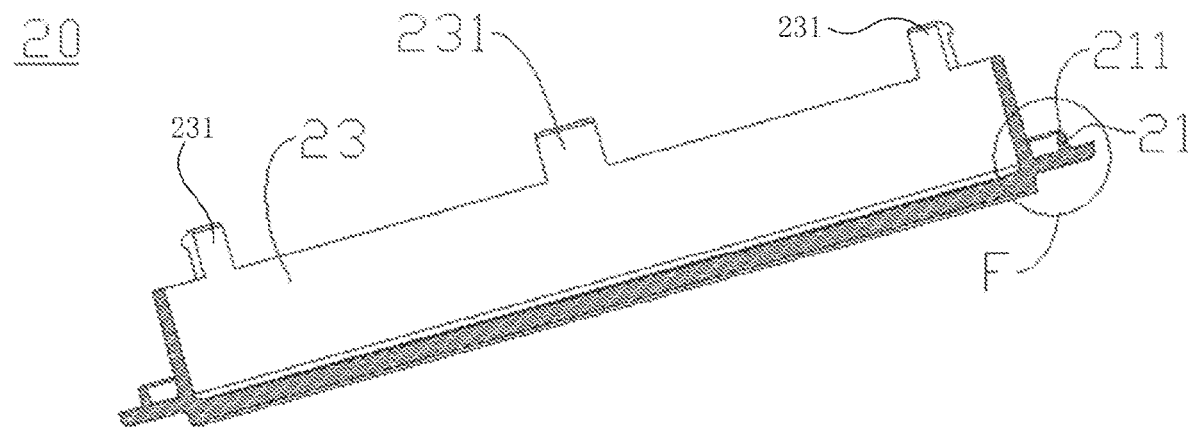
FIG. 18 is a schematic sectional view of the outer end cover in FIG. 14.
Figure 19:
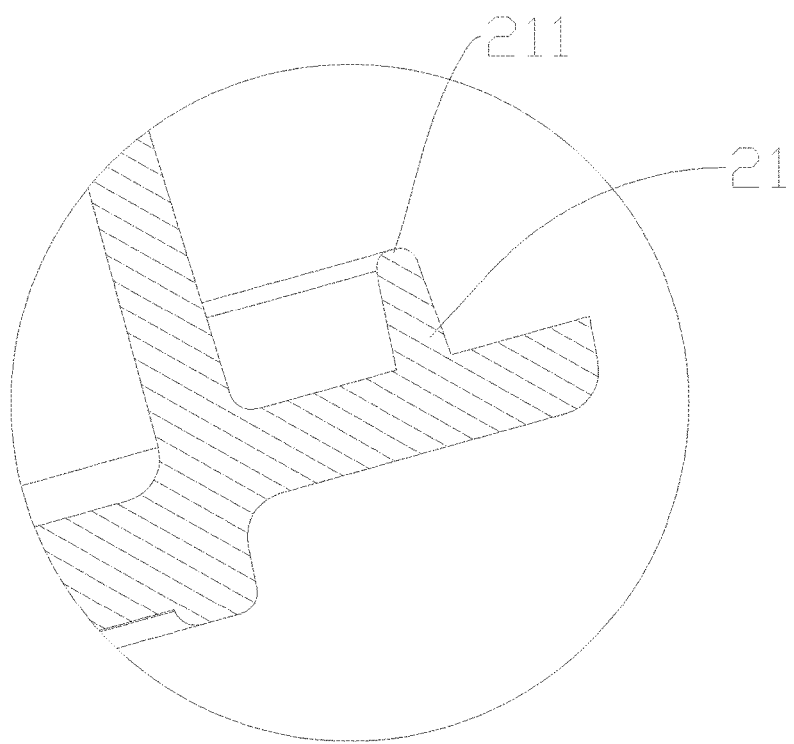
FIG. 19 is a schematic enlarged view of a position F in FIG. 18.
Figure 20:
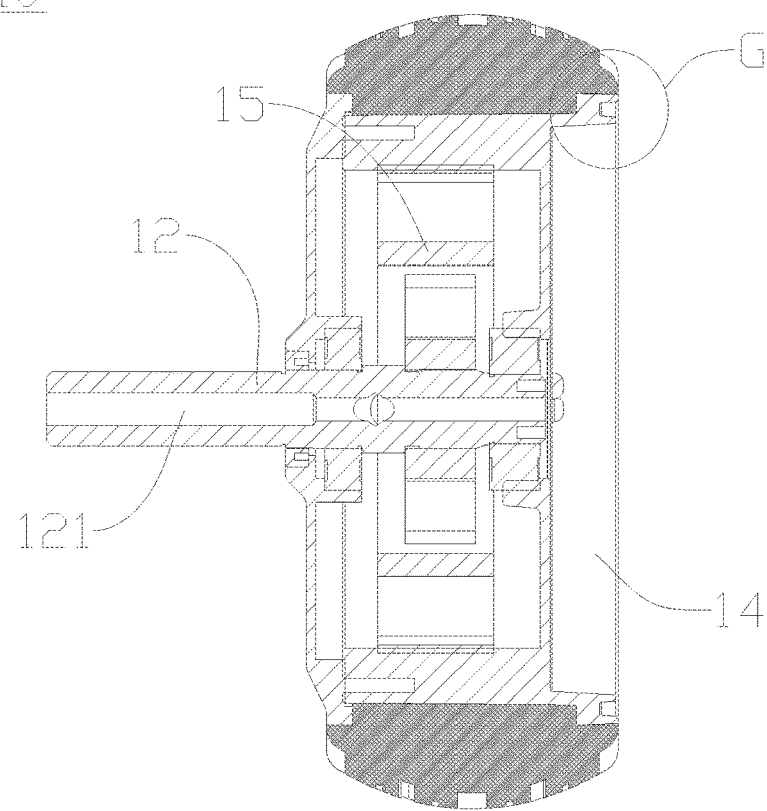
FIG. 20 is a schematic sectional view of a wheel body in FIG. 14.
Figure 21:
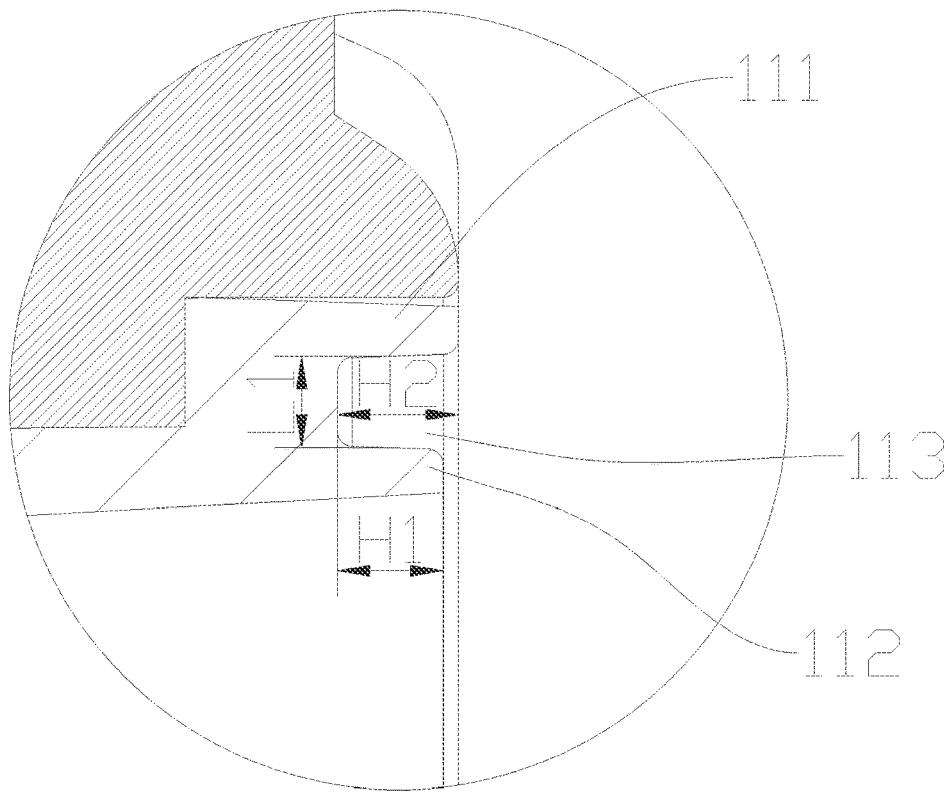
FIG. 21 is a schematic enlarged view of a position G in FIG. 20.
Figure 22:
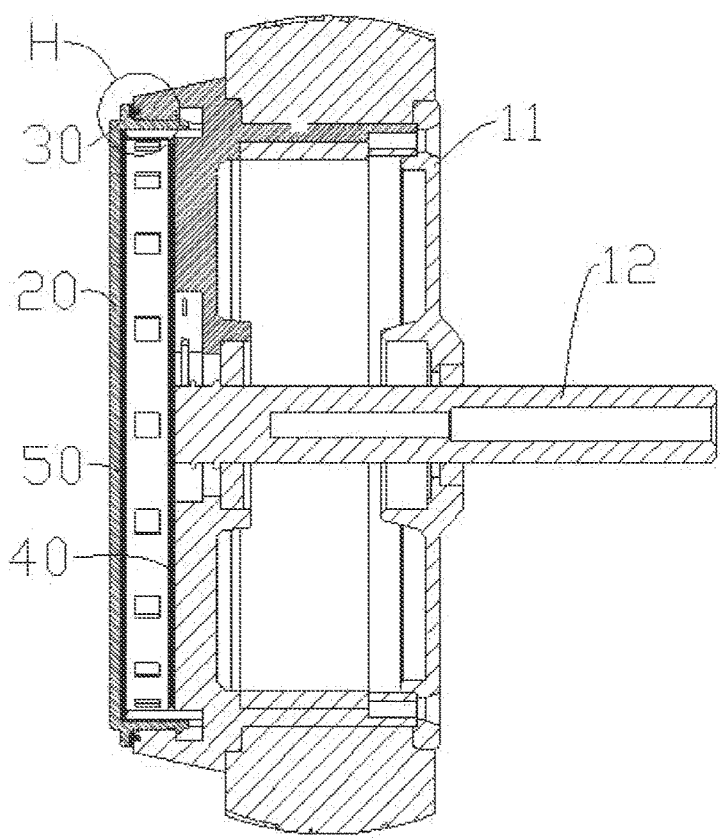
FIG. 22 is a schematic structural diagram of a wheel according to still another embodiment of the present disclosure.
Figure 23:
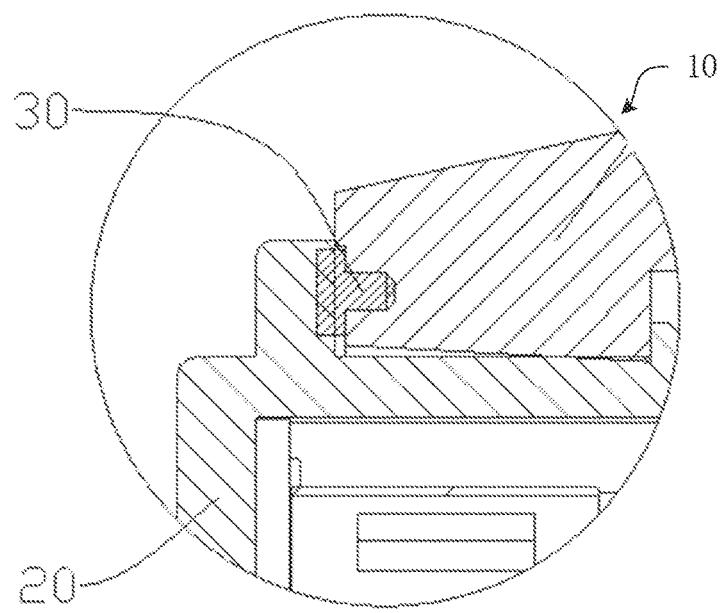
FIG. 23 is a schematic enlarged view of a position H in FIG. 22.
Figure 24:
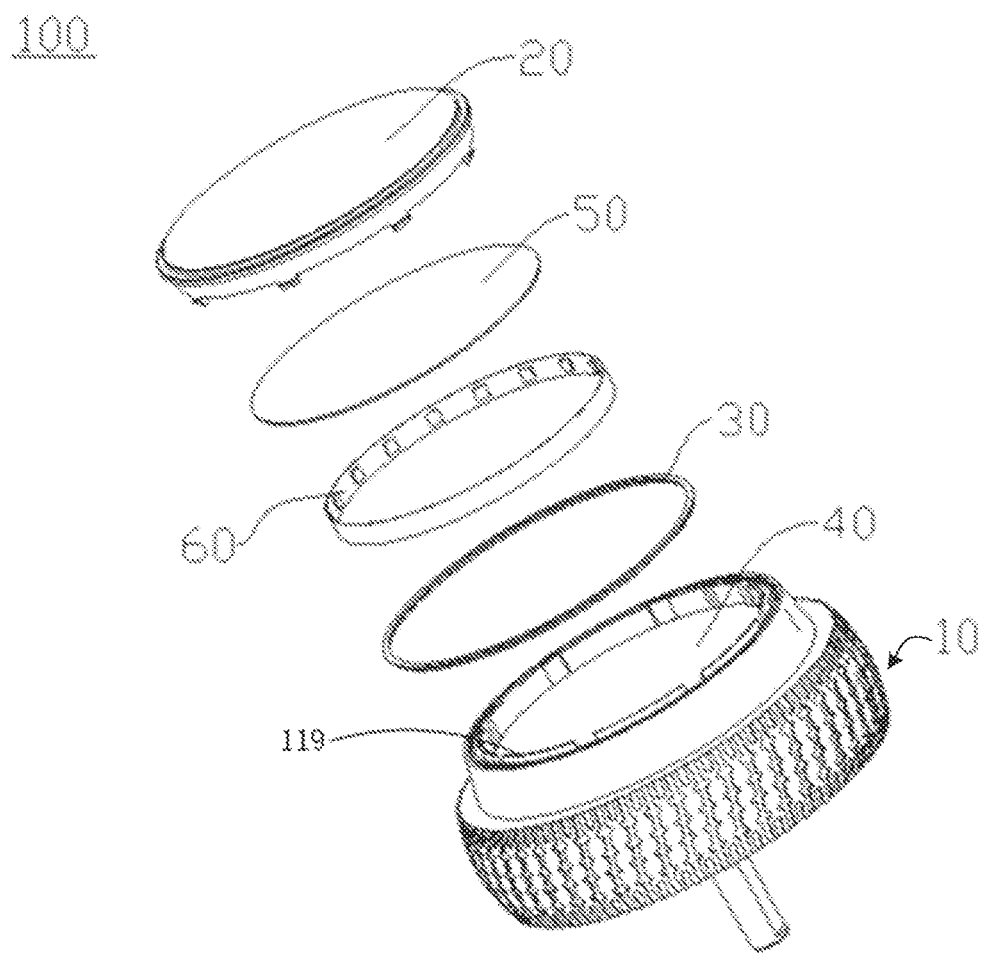
FIG. 24 is a schematic exploded view of the wheel in FIG. 22.
Figure 25:
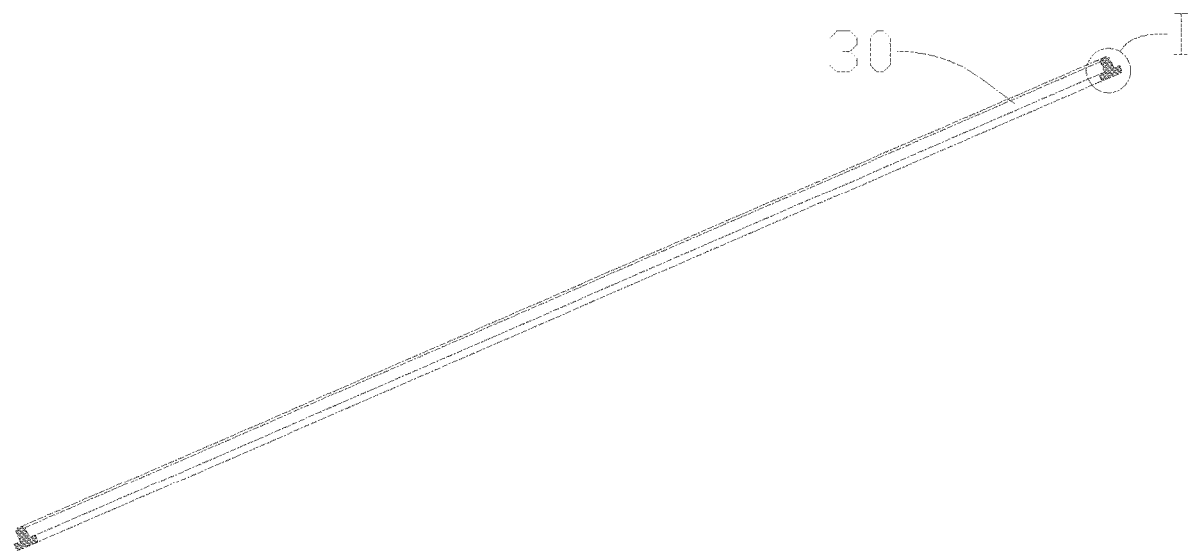
FIG. 25 is a schematic sectional view of a flexible member in FIG. 22.
Figure 26:
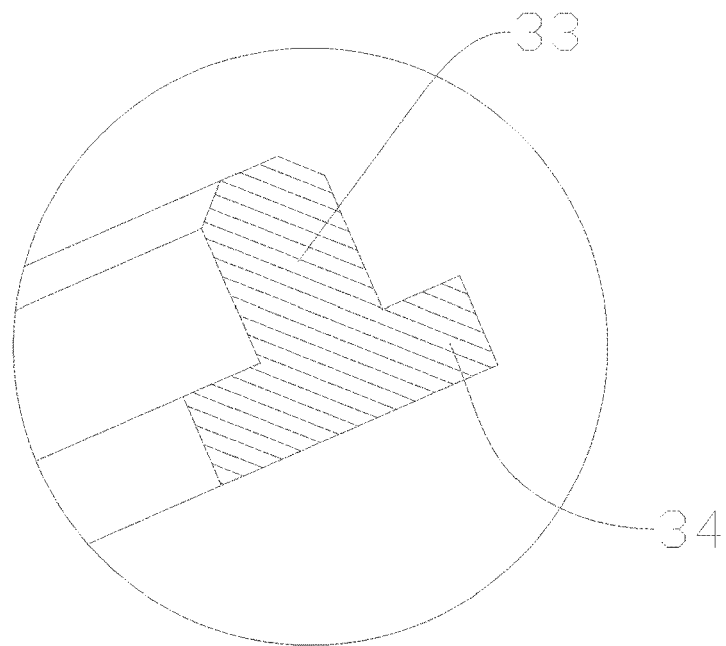
FIG. 26 is a schematic enlarged view of a position I in FIG. 25.
Figure 27:
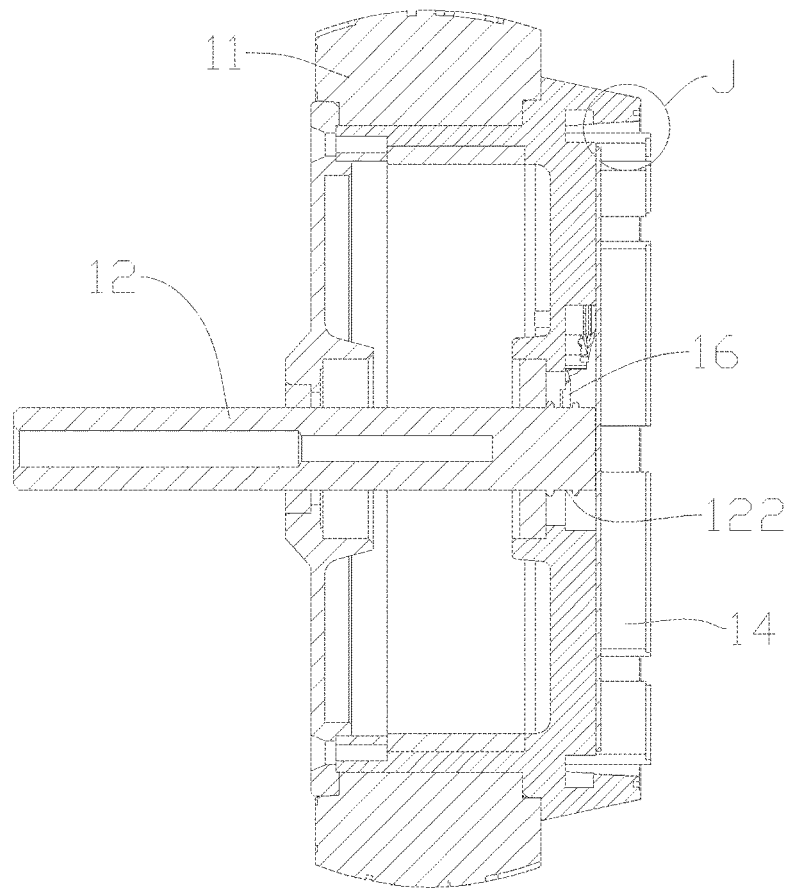
FIG. 27 is a schematic sectional view of a wheel body.
Figure 28:
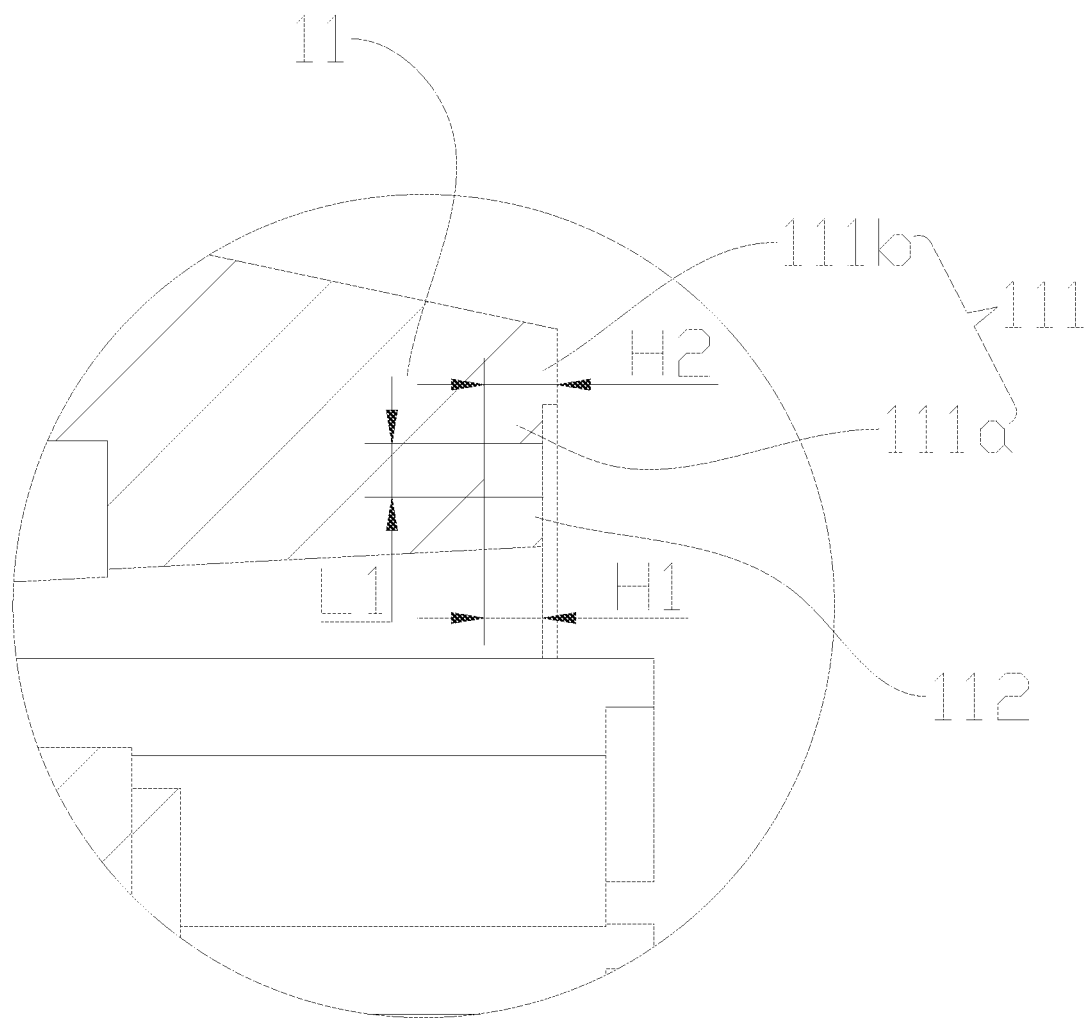
FIG. 28 is a schematic enlarged view of a position J in FIG. 27.

Alternatively, referring to FIG. 18, the first fixing part is a first clamping groove provided on the hub housing 11, the first mounting part is a first buckle 231 arranged on the outer end cover 20, and the first buckle 231 is clamped with the first clamping groove, to complete a fixed connection between the outer end cover 20 and the hub housing 11. In this implementation, an annular flange 23 is annularly arranged on the outer end cover 20, and the first buckle 231 is arranged on the annular flange 23. In this way, not only the first buckle 231 can be prevented from being easily broken due to a problem of being elongated, but also the annular flange 23 can be used to form a waterproof wall, thereby improving the waterproof performance of the lamp cavity structure 14 again.

Figure 8:
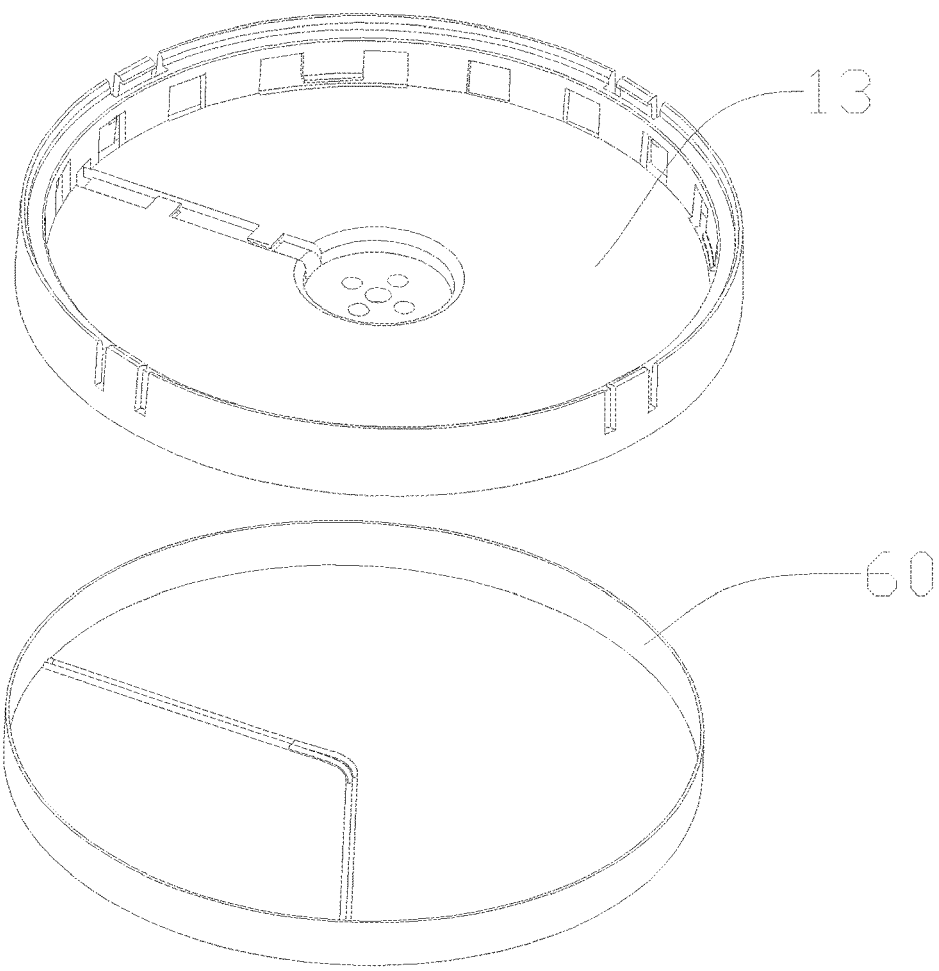
FIG. 8 is a schematic exploded view of a lamp accommodating structure and a light-emitting assembly in FIG. 1.

In an optional implementation, referring to FIG. 8, the wheel body 10 may include a lamp accommodating structure 13 installed in the lamp cavity structure 14, a light-emitting assembly 60 is annularly arranged on an annular side wall of the lamp accommodating structure 13, and a first optical element 40 and a second optical element 50 are installed on the lamp accommodating structure 13. This requires an installation position of the light-emitting assembly 60 to be provided on the lamp cavity structure 14, and the lamp accommodating structure 13 may be designed to be rotatable relative to the hub housing 11 or be fixed to the hub housing 11 as required.

For example, the light-emitting assembly 60 includes an LED light bar, where the annular side wall of the lamp accommodating structure 13 is provided with a light outlet groove 133, the LED light bar is annularly arranged on the annular side wall, and lamp beads of the LED light bar are exposed from the light outlet groove 133.

Figure 9:
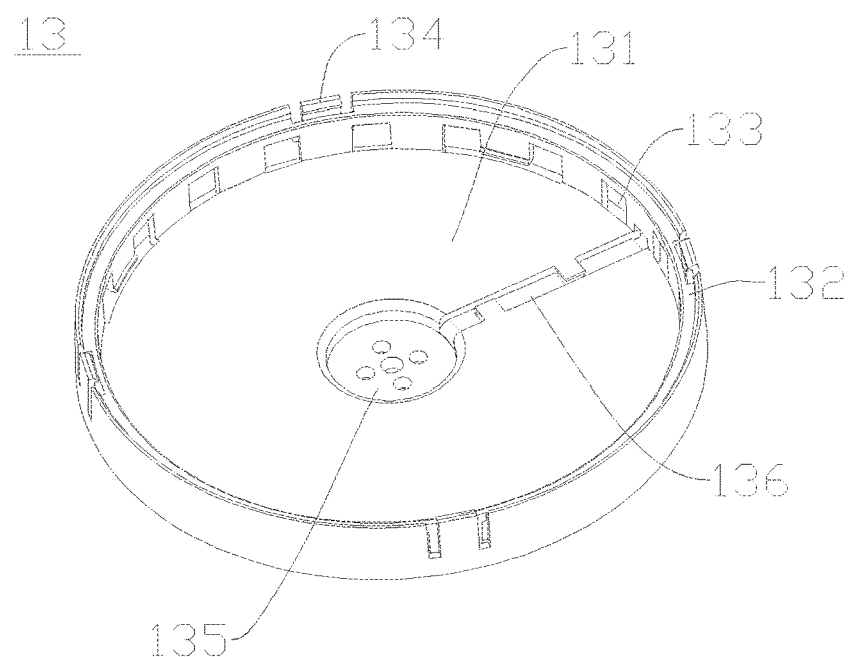
FIG. 9 is a schematic structural diagram of the lamp accommodating structure in FIG. 1.
Figure 10:
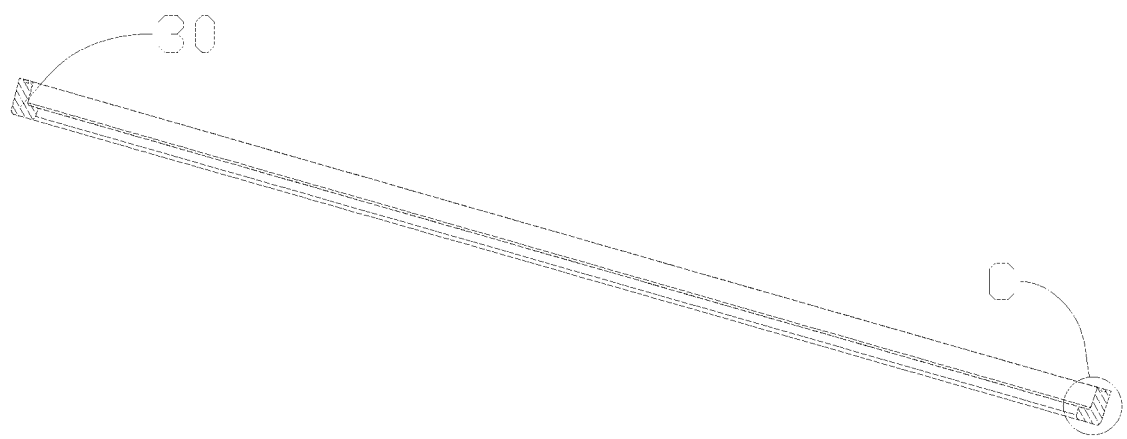
FIG. 10 is a schematic sectional view of a flexible member in FIG. 1.

Specifically, referring to FIG. 9, the lamp accommodating structure 13 includes a lamp holder bottom 131 and an annular side wall annularly arranged on the lamp holder bottom 131, and an end of the annular side wall away from the lamp holder bottom 131 is provided with a lamp holder buckle 134 and a lamp holder abutting table 132. The first optical element 40 fits to the lamp holder bottom 131, the second optical element 50 is clamped on the lamp holder abutting table 132 through the lamp holder buckle 134, and the LED light bar is clamped on the annular side wall.

In an optional implementation, a connecting groove 135 may be concavely arranged on one side of the lamp holder bottom 131 close to the outer end cover 20. Accordingly, with regard to the other side of the lamp holder bottom 131 away from the outer end cover 20, the connecting groove 135 is equivalent to forming a protruding part on the other side (not shown). The protruding part may be referred to as a connecting protrusion, and the connecting protrusion may be fixedly connected to a wheel axle 12 on the wheel body 10, for example, by using a common fixing method such as a screw.

It should be noted that the connecting protrusion is fixed to a fixed end of the wheel axle 12, so that a gap region M (refer to FIG. 2) may be provided between the lamp accommodating structure 13 and the bottom of the lamp cavity structure 14, thereby ensuring that the lamp cavity structure 14 or the hub housing 11 can rotate smoothly relative to the lamp accommodating structure 13.

In this implementation, a routing groove 136 is connected between the connecting groove 135 and the annular side wall, and is used for routing arrangement of the LED light bar.

In an optional implementation, the wheel body 10 includes a motor 15 and a wheel axle 12, where the motor 15 is arranged inside the hub housing 11, for example, the lamp accommodating structure 13 may be fixedly connected to the wheel axle 12 and then located inside the hub housing 11, so that the lamp accommodating structure 13 is fixed relative to the wheel axle 12. In this way, the light-emitting assembly 60 on the lamp accommodating structure 13 and the wheel axle 12 are also fixed, and when the wheel 100 is implemented in a balance vehicle, the light-emitting assembly 60 can keep relatively stationary with a rider on the balance vehicle when the wheel body 10 rotates relative to the ground, and then countless images formed by indefinite reflections of the light-emitting assembly 60 through the first optical element and the second optical element are also relatively stationary with the rider.

In addition, the motor 15 can drive the hub housing 11 to rotate relative to the wheel axle 12. In this implementation, the wheel axle 12 is provided with a routing hole 121, so that a cable electrically connected to the LED light bar can pass through the routing hole 121.

In an optional implementation, as shown in FIG. 22 to FIG. 28, the first protrusion 111 is arranged on an outer side of the groove structure 113, and the second protrusion 112 is arranged on an inner side of the groove structure 113. The first protrusion 111 includes a first step section 111a and a second step section 111b with a height greater than that of the first step section 111a, and the first step section 111a is arranged on one side close to the second protrusion 112. The outer end cover 20 abuts against the first step section 111a or the second protrusion 112 and is located on the inner side of the second step section 111b. The second step section 111b can not only achieve a limiting function, but also achieve a function of a waterproof wall.

In an optional implementation, the height of the first step section 111a is the same as that of the second protrusion 112, so that the outer end cover 20 can abut against the first step section 111a and the second protrusion 112, while an end face of the first step section 11a and an end face of the second protrusion 112 form a reference end face that matches the outer end cover 20, and the groove structure 113 is provided between the first step section 111a and the second protrusion 112. In an optional implementation, the height of the first step section 111a is the same as that of the second protrusion 112, so that the groove structure 113 can have the same distance from the first step section 111a and the second protrusion 112, so that the groove structure 113 can be filled with some flexible members 30 with the same length as the first step section 111a and the second protrusion 112.

In an optional implementation, the height of the second step section 111b is greater than that of the second protrusion 112, so that the second step section 111b can achieve a limiting function and can also achieve the function of a waterproof wall.

In an optional implementation, the wheel 100 further includes a flexible member 30 with a T-shaped structure, where part of the flexible member 30 fills the groove structure 113, and the other part of the flexible member 30 is located on the second step section 111b and the second protrusion 112. The flexible member 30 filling the groove structure 113 achieves a function of fixing the flexible member 30, while the flexible member 30 located on the second step section 111b and the second protrusion 112 is configured to abut against the outer end cover 20, to achieve a waterproof function.

For example, the flexible member 30 includes a fixed section 33 and an abutting section 34. The abutting section 34 extends from two ends of the fixed section 33 to form a T-shaped structure, where the fixed section 33 fills the groove structure 113, and the abutting section 34 is located on the second step section 111b and the second protrusion 112, and is configured to fill gaps between the outer end cover 20 and the second step section 111b and the second protrusion 112.

In an optional implementation, referring to the foregoing similar description of the present disclosure, the ratio of the height H1 of the second protrusion 112 to the average width L1 of the groove structure 113 is greater than 1.6 and less than 1.8, so as to ensure the strength of the second protrusion 112 or the second step section 111b, and the fixed section 33 can be firmly fixed in the groove structure 113.

In an optional implementation, the light-emitting assembly 60 may include an LED light bar, where the LED light bar is annularly arranged inside the lamp cavity structure 14. For example, the inside or bottom of the lamp cavity structure 14 may include an annular light bar mounting wall 119, and the light-emitting assembly 60 may be mounted on an inner side wall of the light bar mounting wall 119. Herein, the inner side wall may refer to a side wall of the light bar mounting wall 119 close to the central axis of the lamp cavity structure 14.

In addition, the LED light bar is connected to a wheel axle electrode 122 in the wheel body 10 through a conductive sheet 16 arranged on the lamp cavity structure 14, so as to ensure that the LED light bar can be electrically connected to the vehicle body through a connection and matching between the conductive sheet 16 and the wheel axle electrode 122. In addition, the LED light bar can rotate relative to the wheel axle 12.

In an optional implementation, the wheel body 10 includes a wheel axle 12 and a conductive sheet 16, where the bottom of the lamp cavity structure 14 is provided with an electrode mounting groove, the wheel axle 12 is provided with an electrode (which may be understood as a conductive terminal), and the conductive sheet 16 is fixed in the electrode mounting groove and abuts against an electrode and is not only simple in structure, but also convenient to install. It should be noted that the shape and material of the conductive sheet 16 are not limited, for example, the conductive sheet may be a sheet with certain elasticity.

In an optional implementation, one side of the outer end cover 20 that faces away from the lamp cavity structure 14 is provided with an outer cover protrusion 24, and the outer cover protrusion 24 can prevent a surface of the outer end cover 20 from being scratched when the outer end cover 20 collides or is placed vertically. In addition, in the process of forming the outer end cover 20 by using a mold, the end cover protrusion 21 or the first fixed column 22 is arranged on the inner side of the outer end cover 20. This easily makes the outer end cover 20 sunken. However, the plastic sinking problem can be solved by the outer cover protrusion 24 in the present disclosure.

In an optional implementation, the outer cover protrusion 24 includes at least two reinforcing ribs arranged at intervals, and two reinforcing ribs are annularly arranged at positions of the outer cover protrusion 24 close to edges. This can increase the strength of the outer end cover 20. In addition, when the wheel body 10 collides, a breakage accident does not occur easily since the at least two reinforcing ribs are provided.

In an optional implementation, the width of the outer cover protrusion 24 is 0.3-2.3 mm, which does not affect the appearance of the outer end cover 20, and can prevent a surface of the outer end cover 20 from being scratched when the outer end cover 20 collides or is placed vertically.

As shown in FIG. 1 to FIG. 28, according to a second aspect of the present disclosure, the present disclosure provides a scooter, which may include a frame and the foregoing wheels 100, where the wheels 100 may be installed on two sides of the frame.

It should be noted that the types of scooters are not limited, for example, the scooters may include a balance vehicle, a go-kart, a kick scooter, a hoverboard, an electric vehicle, and the like.

In the description of the present disclosure, it should be noted that, unless otherwise specified and defined, the terms "install", "connected", and "connect" should be comprehended in a broad sense. For example, these terms may be fixed connection or detachable connection, or integral connection; or may be mechanical connection or electrical connection; or may be direct connection, or indirect connection through an intermediate medium, or internal communication between two elements or the interaction between two elements. The specific meanings of the foregoing terms in the present disclosure may be understood by a person of ordinary skill in the art according to specific circumstances.

In the present disclosure, unless otherwise specified and limited, that a first feature is "above" or "below" a second feature may include that the first feature is in direct contact with the second feature, or that the first feature and the second feature are not in direct contact, but in contact through another feature therebetween. In addition, that the first feature is "above" the second feature includes that the first feature is over or obliquely above the second feature, or simply indicates that a horizontal height of the first feature is greater that of than the second feature. That the first feature is "below" the second feature includes that the first feature is under or obliquely below the second feature, or simply indicates that a horizontal height of the first feature is less than that of the second feature.

The foregoing disclosure provides many different implementations or examples to implement different structures of the present disclosure. To simplify the disclosure of the present disclosure, the components and arrangements of specific examples have been described above. Certainly, these are only examples and are not intended to limit the present disclosure. In addition, in the present disclosure, reference numerals and/or reference letters may be repeated in different examples. This repetition is for the sake of simplicity and clarity, and does not itself indicate the relationship between the various implementations and/or arrangements discussed. In addition, the present disclosure provides examples of various specific processes and materials, but a person of ordinary skill in the art may be aware of the application of other processes and/or the use of other materials.

In the description of this specification, referring to the description of the terms "one implementation", "some implementations", "example implementations", "examples", "specific examples" or "some examples" means that the specific features, structures, materials or characteristics described with reference to the implementations or examples are included in at least one implementation or example of the present disclosure. In this specification, the schematic expressions of the foregoing terms do not necessarily refer to the same implementations or examples. In addition, specific features, structures, materials or characteristics described may be combined in any one or more implementations or examples in a suitable manner.

Although the implementations of the present disclosure have been shown and described, it may be understood by a person of ordinary skill in the art that many changes, modifications, replacements and variations may be made to these implementations without departing from the principles and purposes of the present disclosure, and the scope of the present disclosure is defined by the claims and equivalents thereof.

What is claimed is:

1. A wheel, comprising a wheel body, a light-emitting assembly, a first optical element, a second optical element, and an outer end cover, wherein the wheel body comprises a hub housing, the hub housing is provided with a lamp cavity structure facing an outer side of the wheel, the first optical element is installed at a bottom of the lamp cavity structure, the second optical element is installed at an opening of the lamp cavity structure, the light-emitting assembly is arranged between the first optical element and the second optical element, and the outer end cover covers an outer side of the second optical element,
    wherein a first protrusion and a second protrusion are provided in a contact position of the hub housing where the hub housing can contact the outer end cover, and the first protrusion and the second protrusion jointly form a groove structure.

2. The wheel according to claim 1, wherein a ratio of a height of the first protrusion or the second protrusion to an average width of the groove structure is greater than 1 and less than 2.5.

3. The wheel according to claim 1, wherein the groove structure is filled with an elastic object; and/or the outer end cover is provided with an end cover protrusion, and the end cover protrusion and the groove structure match each other to form a labyrinth connection structure; and/or, the outer end cover is provided with an end cover protrusion, an end of the end cover protrusion is provided with an arc-shaped structure which retracts toward a central axis of the end of the end cover protrusion, and the arc-shaped structure is positioned inside the groove structure and abuts against a flexible member filling the groove structure.

4. The wheel according to claim 1, wherein the first protrusion is arranged on an outer side of the groove structure, the second protrusion is arranged on an inner side of the groove structure, and a height of the first protrusion is greater than that of the second protrusion; and/or a ratio of the height of the first protrusion to the height of the second protrusion is greater than 1.05 and less than 1.35.

5. The wheel according to claim 1, wherein the groove structure is filled with a flexible member with an L-shaped structure, the flexible member is provided with a roughly vertical section and a roughly horizontal section, and a width of the horizontal section matches a width of the groove structure.

6. The wheel according to claim 5, wherein the flexible member is provided with a notch structure, so that when the end cover protrusion matches the groove structure, two opposite sides of the notch structure are capable of fitting together.

7. The wheel according to claim 1, wherein the hub housing is provided with a first fixing part, the outer end cover is provided with a first mounting part, and the outer end cover is fixed to the hub housing through a matching between the first mounting part and the first fixing part.

8. The wheel according to claim 7, wherein the first fixing part is a first fixing hole annularly provided at a bottom of the hub housing, the first mounting part is a first fixed column annularly arranged on the outer end cover, and the first fixed column is clamped with the first fixing hole; and/or, the first fixing part is a first clamping groove arranged on the hub housing, the first mounting part is a first buckle arranged on the outer end cover, and the first buckle is clamped with the first clamping groove.

9. The wheel according to claim 1, wherein the wheel body comprises a lamp accommodating structure installed in the lamp cavity structure, the light-emitting assembly is annularly arranged on an annular side wall of the lamp accommodating structure, and the first optical element and the second optical element are installed on the lamp accommodating structure.

10. The wheel according to claim 9, wherein the light-emitting assembly comprises an LED light bar, the annular side wall of the lamp accommodating structure is provided with a light outlet groove, the LED light bar is annularly arranged on the annular side wall, and lamp beads of the LED light bar are exposed from the light outlet groove; and/or the wheel body comprises a motor and a wheel axle, the motor is arranged inside the hub housing, and the lamp accommodating structure is fixedly connected to the wheel axle.

11. The wheel according to claim 10, wherein the lamp accommodating structure is provided with a connecting protrusion, and the connecting protrusion is fixed to the wheel axle, so that a gap region is provided between the lamp accommodating structure and the bottom of the lamp cavity structure.

12. The wheel according to claim 1, wherein the first protrusion is arranged on an outer side of the groove structure, the second protrusion is arranged on an inner side of the groove structure, the first protrusion comprises a first step section and a second step section with a height greater than that of the first step section, and the first step section is arranged on one side close to the second protrusion.

13. The wheel according to claim 12, wherein the height of the first step section is the same as that of the second protrusion; and/or the height of the second step section is greater than the height of the second protrusion.

14. The wheel according to claim 13, further comprising a flexible member with a T-shaped structure, wherein part of the flexible member fills the groove structure, and the other part of the flexible member is located on the second step section and the second protrusion; and/or the ratio of the height of the second protrusion to the width of the groove structure is greater than 1.6 and less than 1.8.

15. The wheel according to claim 1, wherein the wheel body comprises a wheel axle and a conductive sheet, the bottom of the lamp cavity structure is provided with an electrode mounting groove, the wheel axle is provided with an electrode, and the conductive sheet is fixed in the electrode mounting groove and abuts against the electrode to implement power supply to the light-emitting assembly.

16. The wheel according to claim 1, wherein one side of the outer end cover that faces away from the lamp cavity structure is provided with an outer cover protrusion, the outer cover protrusion comprises at least two reinforcing ribs arranged at intervals, and two reinforcing ribs are annularly arranged at positions of the outer cover protrusion close to edges; and/or the side of the outer end cover that faces away from the lamp cavity structure is provided with an outer cover protrusion, and the outer cover protrusion has a height of 0.3-2.3 mm.

17. The wheel according to claim 1, wherein the first optical element is a plane mirror, the second optical element is a two-way mirror, and an area of any side of the two-way mirror is greater than an area of a reflecting surface of the plane mirror; and/or central axes of the second optical element and the first optical element are collinear.

18. The wheel according to claim 1, wherein one end of an upper surface of the first protrusion away from a central axis of the wheel body is provided with a third protrusion, and the outer end cover is installed on an inner side of the third protrusion.

19. A scooter, comprising a frame and two wheels according to claim 1, where the two wheels may be installed on two sides of the frame.

20. A wheel, comprising a wheel body, a light-emitting assembly, a first optical element, a second optical element, and an outer end cover, wherein the wheel body comprises a hub housing, the hub housing is provided with a fourth protrusion circumferentially arranged around the central axis of the wheel body, the fourth protrusion forms a lamp cavity structure for installing the light-emitting assembly, the first optical element, and the second optical element, and the outer end cover covers an opening of the lamp cavity structure, wherein one end of an upper surface of the fourth protrusion away from the central axis of the wheel body is provided with a fifth protrusion, the outer end cover is installed on an inner side of the fifth protrusion, and the light-emitting assembly is arranged between the first optical element and the second optical element.

* * * * *